US009279046B2

(12) United States Patent
Jayaraman et al.

(10) Patent No.: US 9,279,046 B2
(45) Date of Patent: Mar. 8, 2016

(54) NANOCOMPOSITES AND NANOCOMPOSITE FOAMS AND METHODS AND PRODUCTS RELATED TO SAME

(75) Inventors: Krishnamurthy Jayaraman, East Lansing, MI (US); Tanmay Janardhan Pathak, Lansing, MI (US); Amit Kumar Chaudhary, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 509 days.

(21) Appl. No.: 12/780,461

(22) Filed: May 14, 2010

(65) Prior Publication Data

US 2010/0310802 A1 Dec. 9, 2010

Related U.S. Application Data

(60) Provisional application No. 61/185,062, filed on Jun. 8, 2009.

(51) Int. Cl.
*C08J 9/00* (2006.01)
*C08L 23/02* (2006.01)
(Continued)

(52) U.S. Cl.
CPC .............. *C08L 23/10* (2013.01); *B65D 1/0207* (2013.01); *C08J 9/0066* (2013.01); *C08J 9/0071* (2013.01); *C08L 51/003* (2013.01); *C08J 2323/10* (2013.01); *Y10T 428/1376* (2015.01)

(58) Field of Classification Search
CPC ... C08L 23/10; C08L 2666/24; B65D 1/0207; C08J 9/0071; C08J 2323/10; C08J 51/003; C08J 23/10; C08J 2205/00; C08J 2205/04; C08J 2205/044; C08J 2205/052; C08J 2205/06; B82Y 30/00; B82Y 9/04; Y10T 428/1376

USPC ........ 428/36.5, 317.9; 523/213, 142, 143, 79, 523/86; 977/788; 521/142
See application file for complete search history.

(56) References Cited

U.S. PATENT DOCUMENTS 5,514,734 A * 5/1996 Maxfield et al. ............... 523/204
5,910,523 A * 6/1999 Hudson ......................... 523/213
(Continued)

FOREIGN PATENT DOCUMENTS

WO WO 2007/130755 * 11/2007

OTHER PUBLICATIONS

Karian, H., "Handbook of Polypropylene and Polypropylene Composites", Mareel Dekker, Inc., New York, NY pp. 48 and 49 (2003).*
(Continued)

*Primary Examiner* — Yan Lan
(74) *Attorney, Agent, or Firm* — Marshall, Gerstein & Borun LLP

(57) ABSTRACT

A foam comprising a nanocomposite comprising a bulk linear semi-crystalline polyolefin containing no cross-links or branched polymers; an organoclay; and a polymeric compatibilizer for enhancing physical interactions between the bulk linear semi-crystalline polyolefin and the organoclay, wherein the linear semi-crystalline polyolefin combines with the organoclay to form the nanocomposite is provided. Novel nanocomposites and methods of producing the nanocomposites and foams, such as flexible foams, are also provided. The resulting products are useful in a variety of applications, including thermoplastic flexible foam seals, thermoplastic foamed panels in vehicles, and thin-walled blow molded bottles.

27 Claims, 20 Drawing Sheets

(51) Int. Cl.
*B65D 1/02* (2006.01)
*C08L 23/10* (2006.01)
*C08L 51/00* (2006.01)

(56) References Cited

U.S. PATENT DOCUMENTS

| | | | | |
|---|---|---|---|---|
| 6,759,446 | B2 * | 7/2004 | Lee et al. | 521/83 |
| 2002/0193027 | A1 * | 12/2002 | Dana et al. | 442/285 |
| 2004/0260000 | A1 * | 12/2004 | Chaiko | 524/445 |
| 2007/0269647 | A1 * | 11/2007 | Wu et al. | 428/317.9 |
| 2009/0186227 | A1 * | 7/2009 | Jarus et al. | 428/412 |

OTHER PUBLICATIONS

Champagne, Michael F., et al., "Structural PP Nanocomposites Foams Prepared by Direct CO2 Injection", *Proceedings of ANTEC 2005*, 1477-1481.

Chaudhary, Amit, et al., "Foaming Polypropylene with Nanoclays", *Society of Plastics Engineers Anual Technical Conference 2008*, (May 2008), 7 pgs.

Chaudhary, Amit Kumar, et al., "Preparation of Low Density Polypropylene Foams with Nanoparticles", *Automotive TPO Global Conference, TPO Conference 2008*, (2008), 9 pgs.

Jayaraman, K., et al., "Extensional Melt Flow of Polypropylene-Layered Silicate Nanocomposites", *PPS-24 Polymer Processing Society Annual Meeting in Salerno*, Appendix A, Symposium 18 listed on p. 7 of 8, (Jun. 19, 2008), 39 pgs.

Pathak, Tanmay, et al., "Polymer Clay Nanocomposites with Improved Melt Strength", *Plastics Encounter @ Antec 2007, Annual Technical Conference*, (May 2007), 133-137.

Ramesh, N. S., et al., "Do Nanoparticles Really Assist in Nucleation of Fine Cells in Polyolefin Foams?", *Proceedings of ANTEC 2005*, (2005), 2558-2564.

* cited by examiner

NANOCOMPOSITES AND NANOCOMPOSITE FOAMS AND METHODS AND PRODUCTS RELATED TO SAME

This application claims the benefit under 35 U.S.C. 119 (e) of U.S. Provisional Application Ser. No. 61/185,062, filed Jun. 8, 2009, hereby incorporated by reference in its entirety.

BACKGROUND

With advancements in microcellular foaming technology and a growing need for lightweight materials having a higher strength-to-weight ratio, various thermoplastic polymer foams have been produced with polystyrene, poly (lactic acid), poly (ethylene terephthalate) and polycarbonate. Amongst the various polymers, polystyrene continues to dominate the thermoplastic foam market today.

Although a linear polypropylene (PP) foam is able to withstand higher service temperatures, usage of this type of foam has been largely restricted by the relatively poor rheological properties of linear polypropylene. Attempts to improve these properties by cross-linking a portion of the linear polymer or by adding a long chained branched polymer have resulted in unwanted side effects, including a reduction in recyclability.

SUMMARY

The inventors recognize the need for improving the foaming properties of linear polypropylene and have discovered a formulation and method which is not only inexpensive and less complex, but produces a novel nanocomposite and foaming product which is recyclable and maintains good rheological properties, including high melt strength.

In one embodiment, a foam comprising a nanocomposite comprising a bulk linear semi-crystalline polyolefin containing no cross-links or branched polymers; an organoclay; and a polymeric compatibilizer for enhancing physical interactions between the bulk linear semi-crystalline polyolefin and the organoclay, wherein the linear semi-crystalline polyolefin combines with the organoclay to form the nanocomposite, is provided. In one embodiment, the foam is a flexible foam. In one embodiment, the organoclay is coupled to the polymeric compatibilizer with a coupling agent, such as a silane coupling agent, (e.g., aminosilane). The aminosilane may incorporate one to three alkoxy groups or halide groups and/or have a primary or secondary amine group. In one embodiment, the coupling agent is a titanate or a phosphate.

Any suitable organoclay may be used. In one embodiment, the organoclay has edges and faces, and the polymeric compatibilizer combines with the edges and the faces. In the embodiment shown in FIG. 20, a stack 2000 of three aligned clay layers (A, B and C) is provided, which comprises faces 2002 (lines) and edges 2004 (ends) to which the polymeric compatibilizer (i.e., polymeric compatibilizer chains) 2006 can combine. In one embodiment, the organoclay is a smectite, such as montmorillonite, vermiculite or bentonite. In one embodiment, the organoclay has a surfactant, such as a primary, secondary, tertiary or quaternary onium ion. In one embodiment, the surfactant has one or more alkyl tails.

Any suitable bulk linear semi-crystalline polyolefin may be used, such as a linear polypropylene, although the invention is not so limited. Additionally, any suitable polymeric compatibilizer may be used, such as maleated polypropylene, although the invention is not so limited. In one embodiment, the foam further comprises an elastomer. In one embodiment, the foam has a mean cell size of about 10 microns to 200 microns and/or a cell density of about $10^5$ cells/cm$^3$ to about $10^{10}$ cells/cm$^3$.

In one embodiment, the invention further comprises a nanocomposite comprising a bulk linear semi-crystalline polyolefin containing no cross-links or branched polymers; an organoclay; and a polymeric compatibilizer for enhancing physical interactions between the bulk linear semi-crystalline polyolefin, and the organoclay, wherein the bulk linear semi-crystalline polyolefin combines with the organoclay to form the nanocomposite, wherein the nanocomposite melt displays strain hardening in extensional flow. In one embodiment, the organoclay is coupled to the polymeric compatibilizer with a silane coupling agent. In one embodiment, the various components of the nanocomposites are as described above for foams.

In one embodiment, the organoclay is incorporated at about 0.5 wt % to about 15 wt % or about one(1) to eight (8) wt % or about two (2) to about four (4) wt %. In one embodiment, the polymeric compatibilizer is incorporated at about three (3) wt % to 98 wt % or about three (3) wt % to 40 wt % or about three (3) wt % to about 20 wt %.

In one embodiment, the invention comprises a method comprising combining a semi-crystalline linear polymer having no cross-links or branched chains with an intermediate product, the intermediate product containing a polymeric compatibilizer and an organoclay, to produce a nanocomposite wherein the nanocomposite melt, displays strain hardening in extensional flow. In one embodiment, the method further comprises forming the intermediate product by combining an organoclay with a polymeric compatibilizer in the presence of a coupling agent. In one embodiment, the method further comprises foaming the nanocomposite to produce a foamed product. In one embodiment, an elastomer is added to the nanocomposite prior to being formed into a foam.

Any known conventional method of foaming may be used, such as chemical blowing, physical blowing or blow molding. In one embodiment, the nanocomposite is chemically blown in an extruder or an injection molding process to produce the desired product, such as any of a variety of vehicle components, such as automotive parts, including, but not limited to, flexible foam seals (e.g., primary and secondary seals, beltline weather seals, etc,), thermoplastic foamed panels, and the like. In one, the nanocomposite is blow molded to form various types of packaging products, such as bottles.

DETAILED DESCRIPTION OF THE EMBODIMENTS

Figure 1A:
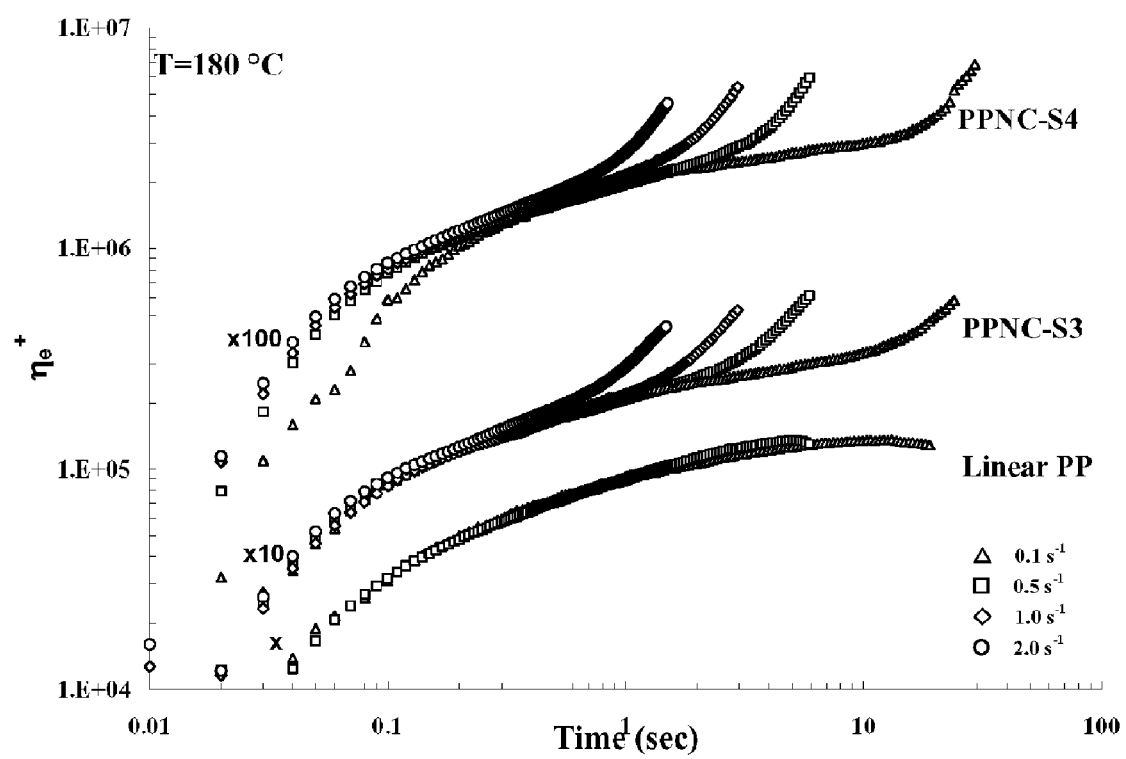
FIG. 1A shows uniaxial extensional viscosity curves at 180° C. for two nanocomposites containing Nanomer® I.30P organoclay treated with amino-methoxy-aza-sila cyclopentanes (PPNC-S3) and dimethoxy silane (PPNC-S4) as compared to linear polypropylene (PP) according to embodiments of the present invention.

In the following detailed description of the preferred embodiments, reference is made to the accompanying drawings, which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that chemical, procedural and other changes may be made without departing from the spirit and scope of the present invention. The following detailed description is, therefore, not to be taken in a limiting sense, and the scope of the present invention is defined only by the appended claims, along with the full scope of equivalents to which such claims are entitled.

The term, "amorphous polymer", as used herein, refers to a polymer having no crystalline regions. An amorphous polymer undergoes a single transition when cooled from a molten phase, to form a glassy solid structure. Examples of amorphous polymers include polystyrenes, such as in Styrofoam® brand foams, which are light, resilient foam made of polystyrenes.

The term, "semi-crystalline polymers", as used herein, refers to a polymer having both crystalline and amorphous regions. The crystalline regions melt at a higher temperature than the amorphous regions, allowing the amorphous regions to start moving around at lower temperatures. However, melting or flow of a semi-crystalline polymer does not occur until the crystalline domains are melted. A semi-crystalline polymer therefore undergoes multiple transitions when cooling from a molten phase, depending on the rate of crystallization, to produce products with varying sizes of crystals, and therefore, varying properties.

The terms "polymer melt" and "nanocomposite melt" (i.e., molten polymer or molten nanocomposite), as used herein, refer to a polymer or a nanocomposite, respectively, in a molten state, which is the state attained when the respective material is at or above its melting temperature.

The term "extensional flow", as used herein, refers to stretching of a molten polymer along one or more directions. Therefore, a polymer melt or nanocomposite melt which exhibits strain hardening in extensional flow, or "a strain hardening melt in extensional flow" refers to a material (e.g., polymer, nanocomposite, and the like) which resists stretching in one or more directions progressively with increasing strain, without breaking, and to a greater extent than observed at the (linear viscoelastic) lower limit of stretch rate for equivalent strains. Conversely, a "non-strain hardening melt in extensional flow" refers to a material which does not exhibit progressively increasing resistance to stretch with increasing strain without breaking and further does not exhibit a resistance noticeably greater than that observed at the (linear viscoelastic) lower limit of stretch rate for equivalent strains.

The term "strain hardening, as used herein, also known as "extensional thickening", refers to the transient elongational viscosity rise above the linear viscoelastic curve, at a constant strain rate.

The term "Type 1 strain hardening" refers to the extent of strain hardening being maintained at the same level as the strain rate is increased over a range (e.g. from 0.1 to 1 $s^{-1}$).

The term "Type 2 strain hardening" refers to the extent of strain hardening being most prominent at the lowest strain rate and declining with increasing strain rate (e.g. from 0.1 to 1 $s^{-1}$).

The term "physical blowing", as used herein, refers to forming foam by injecting gas under pressure into a molten polymer.

The term, "chemical blowing", as used herein, refers to forming foam through addition of a foaming agent. The foaming agent may be added to the polymer at any time during the process, including prior to heating. The chemical foaming agent decomposes above a specified temperature thus liberating gas to make foam.

The term "supercritical foaming", as used herein, refers to injecting a supercritical gas into the polymer melt (i.e., above the critical temperature and pressure of the injected gas). The polymer is then foamed by suddenly lowering the pressure and temperature to allow formation of bubbles having diameters of 5 micrometers to 200 micrometers.

The term "blow molding", as used herein, refers to shaping a molten polymer into a product, such as a bottle, by means of gas pressure.

The term "organoclay" as used herein, refers to layered smectite clay with organophilic ions exchanged into the interlayer galleries. Examples of smectite clay include montmorillonites, vermiculites, and bentonites.

The term "polymeric compatibilizer" as used herein, refers to a polymer modifier that enhances physical interactions between a bulk polymer and another material, such as organoclay. One example of a polymeric compatibilizer is maleated polypropylene, useful for enhancing physical interactions between a bulk polymer and organoclays. A "maleated polypropylene" is a polypropylene that has been chemically modified with maleic anhydride especially at the chain ends.

The term "melt strength" as used herein, refers to a property of a polymer melt, i.e., molten plastic. As such, the melt strength of a polymer melt is an indication of the ability of the melt to thicken and is a further indication of the logarithmic tensile strain or Hencky strain (from 0.1 to 4) up to which the polymer will thicken upon being drawn at different stretch rates without breaking.

The term "melt flow rate" (MFR), as used herein, also known as melt mass flow rate, refers to a property of a polymer which gives an indication of melt processing properties of the polymer and also serves as a rough estimation of molecular weight. MFR is defined as a mass flowed through a die (connected to a barrel, piston and a place for loading masses), in 10 minutes.

The term "bulk", as used herein, when used in conjunction with "bulk linear polypropylene", for example, refers to the maximum volume fraction component in a mixture.

The term "BET", as used herein, is an acronym for a well-known rule for physical adsorption of gas molecules on a solid surface, and is the basis for an analysis technique for the measurement of the specific surface area of a material.

The term "coupling agent" as used herein, refers to an agent that creates a chemical bond between the clay and the polymeric compatibilizer. Examples include silane-based coupling agents and titanate-based and phosphonate-based coupling agents. There will be more detail as to specific examples elsewhere.

The term "open cell foam" as used herein, refers to foams with broken walls of bubbles or cells.

The term "closed cell foam" as used herein, refers to foam which has only bubbles with walls intact.

The term "flexible foam" as used herein, refers to a polymer foam in which a sufficient amount of an elastomer has been incorporated to reduce rigidity of the foam, such that the foam is capable of being formed into shapes having curvature. The amount of elastomer can vary the type of elastomer being used and/or on the desired properties of the final product.

Linear polypropylene is a type of semi-crystalline polymer, which is generally not appropriate for making foams for sealing purposes, due to poor melt strength. Additional methods employed to overcome this limitation include cross-linking part of the linear polymer or adding a long chain branched polymer. However, both of these methods render unwanted effects. Cross-linking reduces the recyclability of the foam, and long chain branched polymers are expensive and increase foam cost.

Foaming of semi-crystalline polymers is also more complex than foaming of amorphous materials due to simultaneous nucleation and growth of gas bubbles and crystals. If crystallization begins during the initial stages of foaming, i.e., before the complete growth and evolution of cell structures, the foam will not fully expand. This problem may be overcome by maintaining a foam expansion temperature higher than the crystallization temperature. However, the cellular structure of semi-crystalline polymer foams is difficult to control, due to the inability of the gas to diffuse into the crystallites, leading to non-uniform bubble nucleation. Early onset of crystallization (before the gas bubbles are nucleated) can lead to reduction in nucleation efficiency, thereby producing non-uniform polymer foam with regions of sparse and dense bubbles.

In one embodiment, the present invention comprises novel nanocomposites, each comprising a polymer matrix, such as a bulk linear semi-crystalline polyolefin containing no cross-linked or branched polymers, in combination with an organoclay and polymeric compatibilizer. In one embodiment, the nanocomposites further comprise a coupling agent. In one embodiment, the nanocomposites further comprise an elastomer. The novel nanocomposites discussed herein display strain hardening in extensional flow over a larger range of strains and stretch rates than observed with bulk linear semi-crystalline polyolefin melts. The nanocomposites further provide additional nucleating sites for foaming the polymer matrix.

In one embodiment, the present invention comprises novel foamed products, each comprising a nanocomposite comprising a bulk linear semi-crystalline polyolefin which contains no cross-linked or branched polymers in combination with an organoclay and polymeric compatibilizer. In one embodiment, the novel foamed products further comprise a coupling agent. In one embodiment, the novel nanocomposites further comprise an elastomer. The resulting closed cell foams have a more uniform cell size distribution in the range of 85 microns±20 microns as compared with open cell foams made with bulk semi-crystalline polyolefin whose melt is non-strain hardening.

In one embodiment, the present invention comprises a method for producing a novel intermediate product comprised of an organoclay and polymeric compatibilizer. In one embodiment, the method further includes addition of a coupling agent to produce the intermediate product.

In one embodiment, the method comprises use of a master batch or pre-blend (comprised of the intermediate product) to produce the novel nanocomposites. In one embodiment, the pre-blend further includes a coupling agent. Use of a pre-blend eliminates the need for foam manufacturers to provide processors for adding and dispersing the organoclay, although the invention is not so limited.

In one embodiment, the present invention comprises a novel method for producing the novel linear semi-crystalline nanocomposites having the improved properties noted above. In one embodiment, the novel method includes incorporating an organoclay and a polymeric compatibilizer with a bulk linear semi-crystalline polyolefin to produce a nanocomposite.

Addition of organoclay not only alters the crystallization kinetics of the bulk linear semi-crystalline polyolefin, it maintains recyclability of the resulting foam product, increases stiffness and further eliminates the need for cross-linking and/or addition of one or more long chain branched polymers to achieve appropriate melt strength for foaming.

In one embodiment, the present invention further comprises foaming the novel nanocomposites to produce foamed products. In one embodiment, a chemical blowing agent is used to foam the novel linear semi-crystalline nanocomposite in a single screw extruder. The resulting closed cell foams have a more uniform cell size distribution as compared with linear polypropylene foams. In one embodiment, the mean cell size is about 10 micrometers to 150 micrometers, and the cell density is about $10^5$ cells/cm$^3$ to about $10^{10}$ cells/cm$^3$. Such foams are useful in a wide array of applications, including trims, door seals and instrument panels in the auto industry, insulation materials, furniture, sports products, and various products in the packaging industry.

Blow molding can be used to produce a wide array of containers having various shapes and sizes. In one embodiment, blow molding is used to produce bottles, such as bottles used for various consumer products, including, but not limited to, detergents (e.g., dishwasher detergents, laundry detergents, and the like), bleaches, lotions, gardening liquids, and the like.

In one embodiment, any linear polypropylene that may benefit from the formulation and methods described herein may be used. In one embodiment, the bulk linear semi-crystalline polymer is any linear polyolefin, such as a "low", "medium" or "high" density linear polyethylene, as these terms are understood in the art. In one embodiment, a blend of olefinic or ethylene-α olefin elastomer (e.g., ethylene-propylene, ethylene-octene) and linear polyolefins having low melt strength, which prevent formation of closed cell flexible foams when used alone, are used.

In one embodiment about 0.01 wt % to about 97 wt % of linear polypropylene is used, including any range there between. In one embodiment, about 40 wt % to about 95 wt % is used. In one embodiment, up to 45 wt %, up to 50 wt % up to 55 wt % or up to 60 wt % or up to 70 wt % up to 75 wt %, up to 80 wt %, up to 85 wt %, up to 90 wt %, up to less than 95 wt %, such as about 70 to 85 wt % of linear polypropylene is used In one embodiment, the polymeric compatibilizer is maleated polypropylene. In one embodiment about 3 wt % to about 97 wt % of a polymeric compatibilizer, such as maleated propylene, is used, including any range there between. In one embodiment, up to 5 wt %, up to 10 wt %, up to 20 wt %, up to 30 wt %, up to 40 wt %, up to 50 wt %, up to 60 wt %, up to 70 wt %, up to 80 wt %, up to 90 wt %, up to 95 to less than 97 wt % is used, such as about 5 wt % to 25 wt %. In one embodiment, about 5 wt % to 25 wt % of a polymeric compatibilizer is used.

Organoclays are comprised of stacked rectangular layers or platelets (which includes square platelets). As such, organoclays are often categorized by their aspect ratios, which is a ratio of the square root of the planar area of any one platelet to its thickness. Any organoclay having a suitable aspect ratio may be used in embodiments of the present invention. If the aspect ratio is too high, the organoclay will be more difficult to disperse in the polymer matrix. If the aspect ratio is too small, the improvement to properties of the resulting nanocomposite, such as melt strength, may be marginal, and properties may not be satisfactory. In one embodiment, the organoclay has an aspect ratio which enhances melt strength, i.e., which promotes affinity between the organoclay and the polymer matrix, not only at use temperatures, but even while processing is ongoing at high temperatures.

In one embodiment, the aspect ratio is at least 100:200. In one embodiment, the aspect ratio is no more than about 300:500. In one embodiment, the aspect ratio may be any ratio between about 100-300:200-500, although the invention is not so limited.

In one embodiment, about 0.5 wt % to about 15 wt % organoclay is used. In one embodiment about one (1) wt % to about 10 wt % is used, including any range there between. In one embodiment, about two (2) to about five (5) wt % is used. In one embodiment, up to 6 wt %, up to 7 wt %, up to 8 wt %, up to 9 wt %, up to 10 wt %, up to 11 wt % up to less than 12 wt % organoclay is used, such as about two (2) wt % to about five (5) wt %.

In one embodiment, the proportions of components may be, for example, linear polypropylene (PP) about 40 wt % to about 97 wt %; maleated polypropylene (PP-g-MA) about three (3) wt % to about 55 wt % and organoclay (about 0.5 wt % to about 15 wt %).

Any suitable coupling agent may also optionally be added to produce the intermediate product. The coupling agent serves to improve the melt strength of the resulting nanocomposites. In one embodiment, the addition of a coupling agent comprises a silane treatment with an organosilane having one or more alkoxy groups, such as monomethoxy, dimethoxy and/or trimethoxy group, or one or more halide groups (e.g., chloride, bromide, or iodide) and a functional group, such as an amino group or an aza group.

In one embodiment, an amino silane is used, including, but not limited to, amino-dimethoxy silane, amino-trimethoxy silane, and amino-aza sila-cyclopentanes. In one embodiment, an aza silane is used.

In one embodiment, the silane treatment comprises about 0.05 g to about one (1) of silane/g organoclay, including any range there between. In one embodiment about 0.2 to about 0.4 g silane/g organoclay is used, such as about 0.3 g/g organoclay.

In one embodiment, flexible foams are produced by adding a sufficient amount of any suitable elastomer. In one embodiment, elastomer is added in an amount sufficient to produce a foam capable of deflecting under a bending force to fit snugly between other parts. In one embodiment about 20 to about 30 wt % of elastomer is added, although the invention is not so limited. In one embodiment, an elastomer is added at a level of about 15 parts per hundred of PP to 35 parts per hundred of PP. In one embodiment, an elastomer, such as ENGAGE™ and INFUSE™ copolymers made by Dow Chemical Co., Midland, Mich., or SEBS copolymer made by ExxonMobil is added to the foam.

In one embodiment, self-skinning flexible foams are produced. These foams are able to "self-skin" because the bulk polymer is a semi-crystalline thermoplastic. This feature therefore eliminates a skinning step from a two-stage thermoset process, which normally includes a first foaming step and a second skinning step.

The invention will be further described by reference to the following examples, which are offered to further illustrate various embodiments of the present invention. It should be understood, however, that many variations and modifications may be made while remaining within the scope of the present invention.

Example 1

In this study, a 4 MFR linear polypropylene (PP), Pro-fax® 6523 supplied by Lyondell-Basell was compounded with different intermediate products comprising montmorillonites (Nanomer® I.30P or Nanomer® I.44P) from Nanocor, Inc. (which themselves were further treated with various silanes as identified herein, from Evonik Industries and from Gelest) and a polymeric compatibilizer (polypropylene-grafted with maleic anhydride (PP-g-MA)) "PO1015" from ExxonMobil, to produce various nanocomposites, labeled in FIGS. 1A, 1B and 1C as, S3, S4, S5, S6 and S7. The compound labeled S6 did not have any silane treatment.

The Nanomer® organoclays used in these experiments contain ionic surfactants. The surfactant in the I.30P Nanomer® organoclay is a primary onium ion with a single C18 tail. The surfactant in the I.44P Nanomer® organoclay is a quaternary onium ion with two C18 tails.

Intermediate Product (Silane-Treated Organoclay) Preparations
Solution Preparation Solutions were prepared with 4.5 g of N-aminoethyl-aza-2,2,4 trimethyl sila-cyclopentane (also referred to as amino-aza-sila cyclopentane) (Gelest), or 4.5 g of N-aminoethyl 3-aminopropylmethyl dimethoxy silane (also referred to as amino-dimethoxy silane) (Evonik Industries), or 4.5 g of N-aminoethyl 3-aminopropyl trimethoxy silane (also referred to as aminotrimethoxy silane) (Evonik Industries) in 200 ml methanol (Sigma Aldrich, 99.8% purity). Each solution was added to a suspension of 15 g Nanomer® I.30P organoclay in 500 ml methanol.

A solution was also prepared with 4.5 g of N-aminoethyl 3-aminopropylmethyl dimethoxy silane (Evonik Industries) in 200 ml methanol (Sigma Aldrich, 99.8% purity). This solution was added to a suspension of 15 g Nanomer® I.44P organoclay in 500 ml methanol.

Procedure

Each solution was maintained under constant stirring conditions using a magnetic stirrer, at room temperature for six (6) hours. The clay suspension was then filtered using Whatman #2 filter paper, and washed with methanol at least 3 times to wash out the unreacted silane material. The wet organoclays were then cured and dried in a vacuum oven (Fisher scientific Vacuum Oven, Model 28A), at 180° C., under a vacuum of 20 mm Hg for 24 hours. The dried organoclays were then powdered and filtered through a 200-mesh screen to organoclays having nanolayers (nanoclay).

BET measurements (performed with a Micrometrics Gemini V surface area analyzer) of available surface area on the organoclays before and after the silane treatments confirmed that the silane occupied sites at the edges and at the faces of the organoclay nanolayers. Specifically, the BET surface area dropped from 9.51 $m^2/g$ for the I.30P before silane treatment to 3.82 $m^2/g$ for the silane treated I.30P organoclay.

Preparation of Nanocomposites

In all instances, the resulting intermediate product was compounded at 3 wt % with the linear PP (85% wt) and polypropylene grafted with maleic anhydride (PP-g-MA) (12 wt %) to produce the nanocomposites (S3-S7).

A summary of the nanocomposite formulations (S3-S7) is shown in Table 1 below:

TABLE 1

Summary of Nanocomposite Formulations (S3-S7) (% = wt %)

PPNC-S3 ("S3")

(85%) linear polypropylene Profax ® 6523 from Lyondell-Basell
(12%) maleated polypropylene PO1015 from ExxonMobil
(3%) Nanomer ® I.30 P organoclay from Nanocor, Inc., which was additionally treated with N-aminoethyl-aza-2,2,4 trimethyl sila-cyclopentane (Gelest)

PPNC-S4 ("S4")

(85%) linear polypropylene Profax ® 6523 from Lyondell-Basell
(12%) maleated polypropylene PO1015 from ExxonMobil
(3%) I.30 P Nanomer ® organoclay from Nanocor, Inc., which was additionally treated with N-aminoethyl 3-aminopropylmethyl dimethoxy silane (Evonik Industries)

PPNC-S5 ("S5")

(85%) linear polypropylene Profax ® 6523 from Lyondell-Basell
(12%) maleated polypropylene PO1015 from ExxonMobil
(3%) I.30 P Nanomer ® organoclay from Nanocor, Inc., which was additionally treated with N-aminoethyl-3-Aminopropyl trimethoxysilane (Evonik Industries)

PPNC-S6 ("S6")

(85%) linear polypropylene Profax ® 6523 from Lyondell-Basell
(12%) maleated polypropylene PO1015 from ExxonMobil
(3%) I.44P Nanomer ® organoclay from Nanocor, Inc.

PPNC-S7 ("S7")

(85%) linear polypropylene Profax ® 6523 from Lyondell-Basell
(12%) maleated polypropylene PO1015 from ExxonMobil
(3%) I.44P Nanomer ® organoclay from Nanocor, Inc., which was additionally treated with N-aminoethyl 3-aminopropylmethyl dimethoxy silane (Evonik Industries)

Extrusion of Foams

Continuous extrusion foaming was used to prepare PP nanocomposite foams from the nanocomposites. A ¾ in. single screw extruder was used for this purpose with a 2 mm diameter die having L/D=20 and a tapered transition from the extruder barrel. The extruder has four different temperature zones—three in the barrel and one in the die. The chemical blowing agent (CBA) was used at 3 wt % in this study. The CBA was premixed with the granulated polymer in a bag and was fed through the hopper. The extruder was operated at a constant speed of 25 rpm in this study. The temperature zone near the hopper was maintained at 180° C., the middle zone was 200° C. (the decomposition temperature of CBA) and the third zone was maintained at 175° C. The die wall was maintained at a temperature 15° C. above the onset of crystallization temperature.

Characterization

The crystallization temperatures and crystallization rate of the nanocomposites were estimated by Differential Scanning Calorimetry using a TA Instruments Q-10 DSC. The sample was heated to 200° C. (5/min ramp), cooled to 40° C. (−5° C./min ramp) and this was repeated. The melting peak observed in the reheat was recorded along with the crystallization peak after the reheat, according to standard practice.

The dispersion of nanoclay in the PP matrix was characterized by X-Ray diffraction studies on a Rigaku Rotaflex Ru-200BH X-ray diffractometer. The PP nanocomposite was molded in a Wabash press at 180° C. and 10 tons (20,000 pounds) into a 1 mm thick disc that is 50 mm in diameter; a strip measuring 40 mm×20 mm×1 mm was cut out of this disc. The densities of the foam samples were measured by the Archimedes water displacement method (ASTM D792). The reported value of density is an average of three data points as is known in the art.

The melt elongational viscosity was measured using an elongational viscosity fixture (EVF) on a TA Instruments ARES rheometer. Test specimens (18 mm×10 mm×0.75 mm) were compression molded in a Wabash press at 180° C. and a pressure of 5 tons (10,000 pounds) and cooled under ambient conditions in order to reduce thermal stress on the samples. Extensional viscosity measurements were made for the nanocomposites after overnight drying, at 180° C. and at four strain rates (0.1, 0.5, 1.0 and 2.0 s$^{-1}$) over Hencky strains up to three (3)

The foam structure was studied by scanning electron microscopy (JEOL 6400 by Japan Electron Optics Laboratories). The foam extrudates were cryogenically fractured and the fractured surface was coated with osmium particles using NEOC-AN, Meiwa Shoji Co. LTD, Japan. SEM micrographs were taken from these fractured surfaces at a magnification of 60×. The average cell size, cell size distribution and cell density were evaluated using "ImageJ" software (a public domain, Java-based image processing program developed at the National Institutes of Health).

The cell density was calculated based on the following equation:

$$N = \left(\frac{n}{A}\right)^{3/2} \quad (1)$$

where "n" is the number of cells in the defined area "A."

Results and Discussion

Extensional Viscosity

Figure 1B:
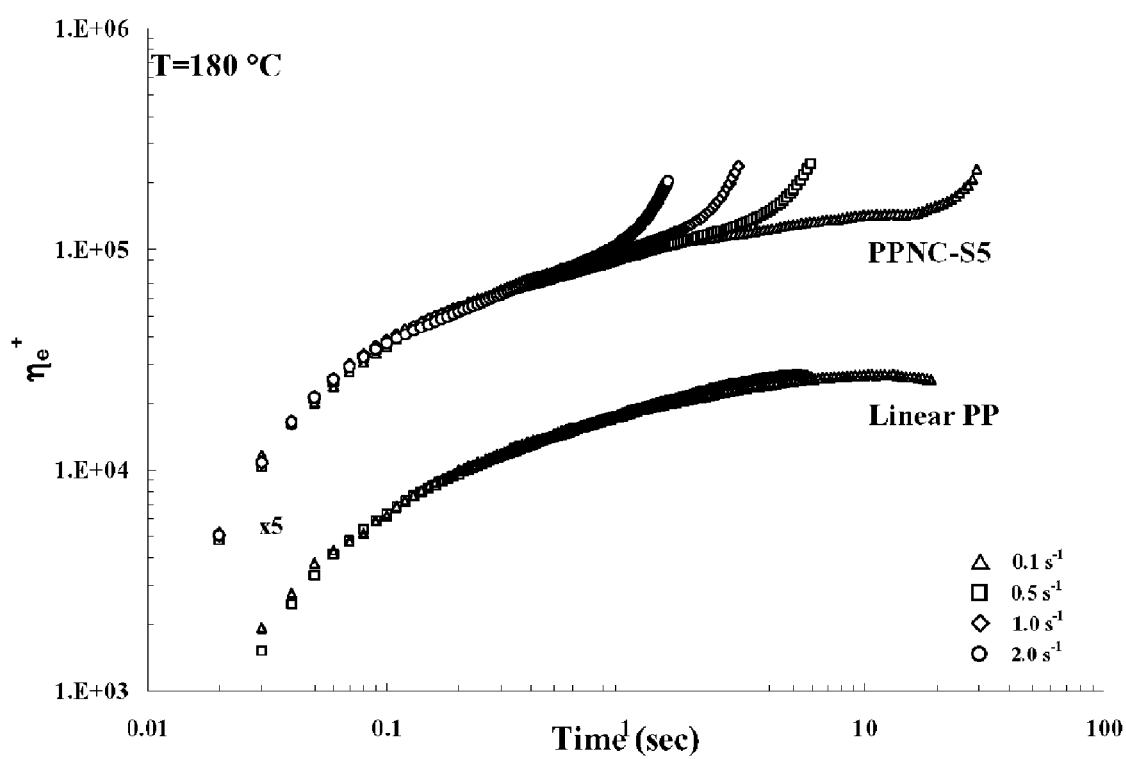
FIG. 1B shows uniaxial extensional viscosity curves at 180° C. for a nanocomposite containing Nanomer® I.30P organoclay treated with trimethoxy silane (PPNC-S5) as compared to linear PP according to an embodiment of the present invention.
Figure 1C:
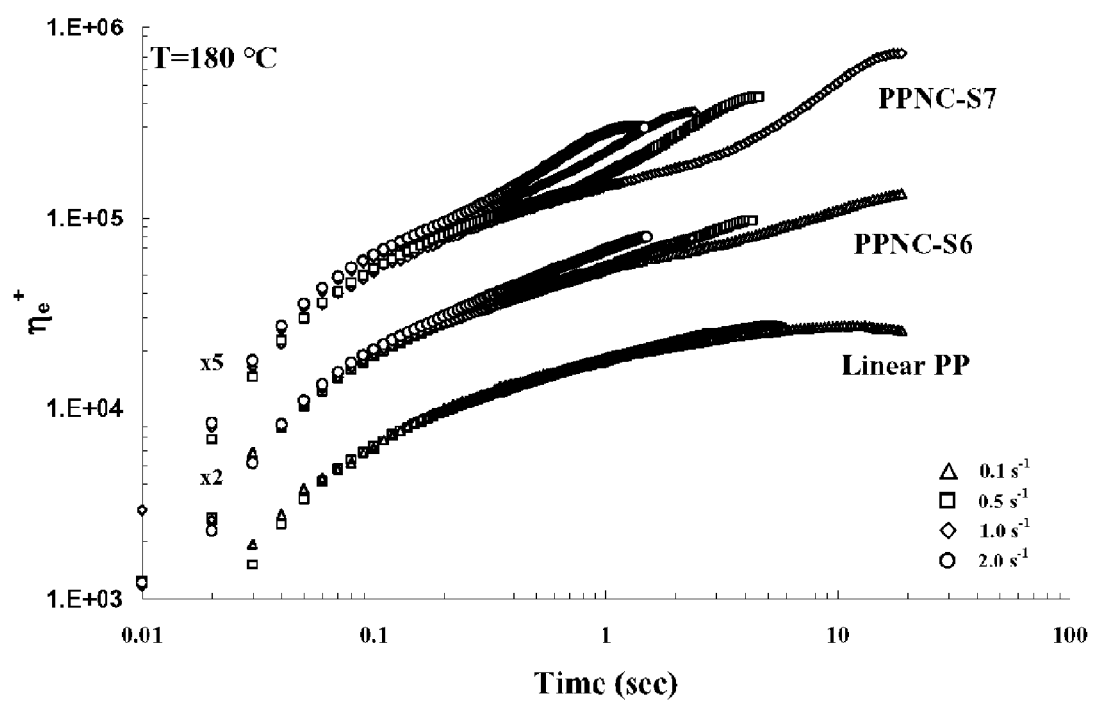
FIG. 1C shows uniaxial extensional viscosity curves at 180° C. for a non-silane treated nanocomposite (PPNC-S6) containing Nanomer® I.44P and for another nanocomposite containing Nanomer® I.44P organoclay treated with amino-dimethoxy silane (PPNC-S7) as compared to linear PP according to embodiments of the present invention.

FIG. 1A shows uniaxial extensional viscosity curves at 180° C. for two nanocomposites containing Nanomer® I.30P organoclay treated with amino-methoxy-aza-sila cyclopentane (S3) and amino dimethoxy silane (S4) as compared with linear PP. FIG. 1B shows uniaxial extensional viscosity curves at 180° C. for a nanocomposite containing Nanomer® I.30P organoclay treated with amino trimethoxy silane (S5) as compared to linear PP. FIG. 1C shows uniaxial extensional viscosity curves at 180° C. for a nanocomposite (S6) containing non-silane treated Nanomer® I.44P and another nanocomposite containing Nanomer® I.44P organoclay treated with amino-dimethoxy silane (S7) as compared to linear PP.

As FIGS. 1A-1C show, the resulting nanocomposites displayed significant strain hardening or increase in viscosity at higher strains in uniaxial extensional flow at 180° C. In comparison, linear PP showed no strain hardening. The beneficial effect of silane-treated clay on strain hardening of the melt is evident in that S3, S4, S5 and S7 showed more prominent strain hardening than S6, which is comprised of organoclay without any silane treatment. For S3, S4 and S5, the extent of strain hardening was maintained over a range of strain rates (type 1 strain hardening). Although the extent of strain hardening in S7 is higher than in S6, both S6 and S7 exhibited type 2 strain hardening such that the extent of strain hardening declined with increasing strain rate.

Dispersion of Nanoclays

Figure 2:
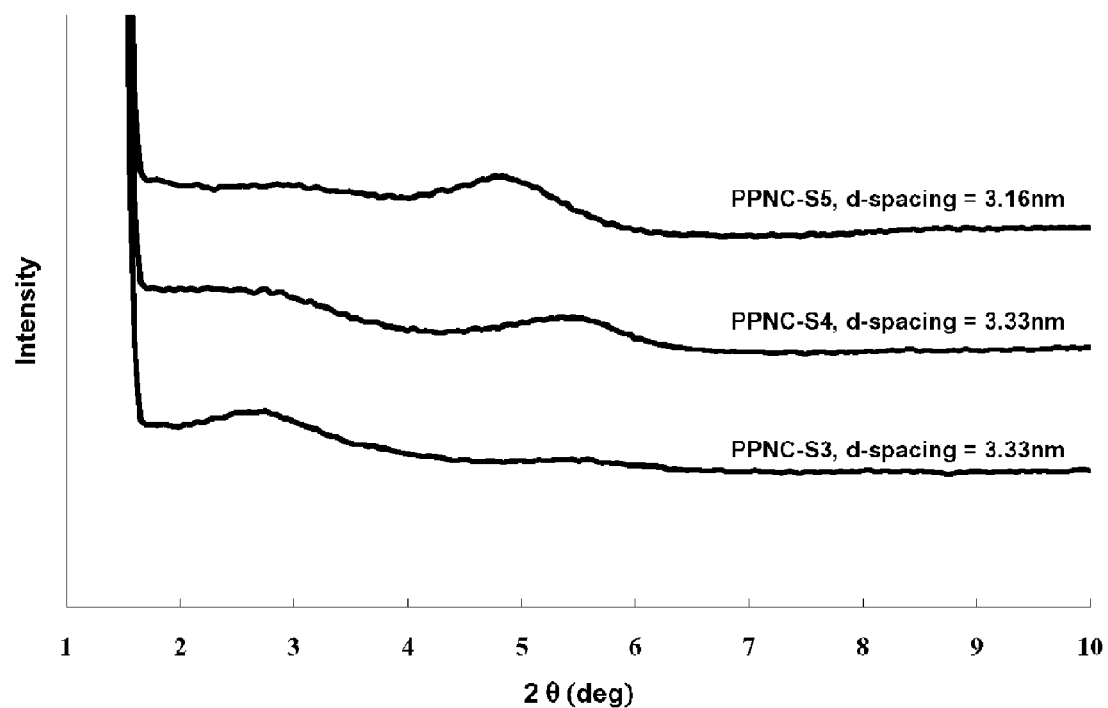
FIG. 2 shows X-Ray diffraction patterns for nanocomposites PPNC-S3 through PPNC-S5 according to embodiments of the present invention.

FIG. 2 shows X-Ray diffraction patterns for nanocomposites S3 through S5 indicating progressively increasing extent of exfoliation of the clay from S3 to S4 to S5.

Crystallization Curves

Figure 3:
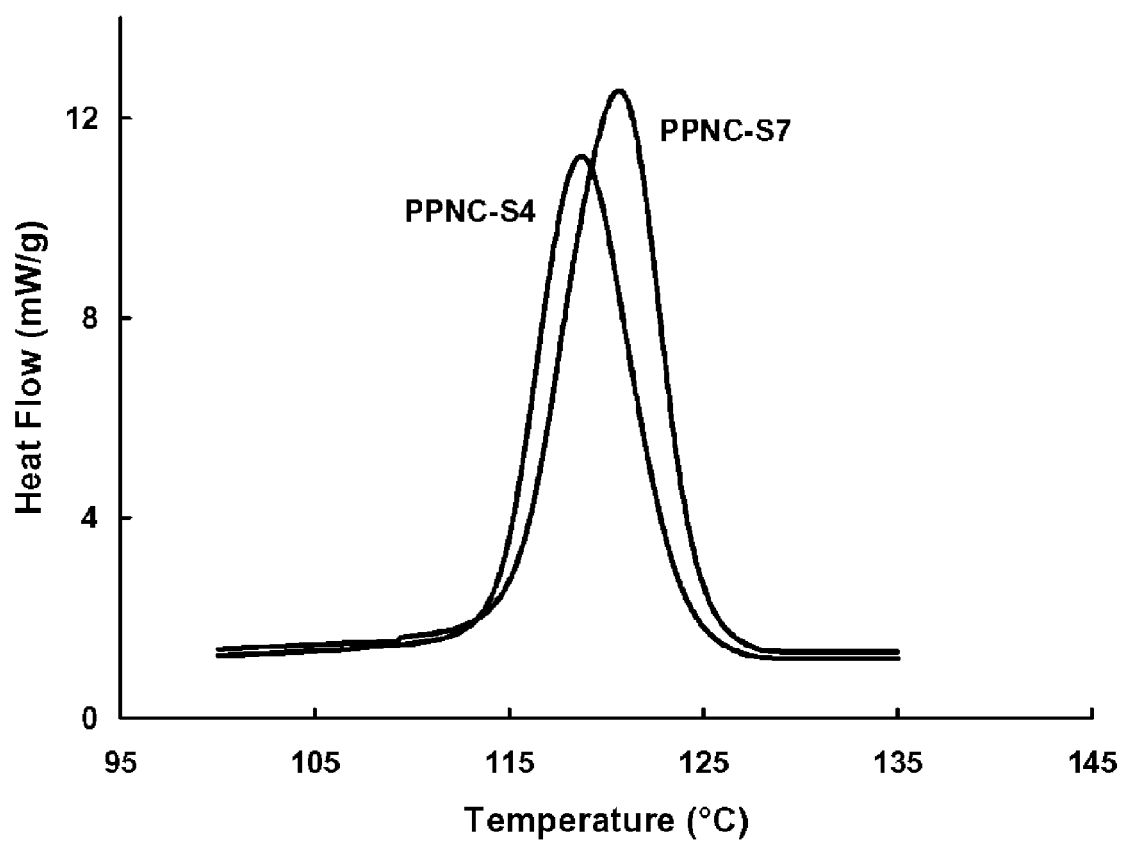
FIG. 3 shows DSC crystallization curves of PPNC-S4 and PPNC-S7 according to embodiments of the present invention.

DSC tests were run on the nanocomposites to identify the melting temperature and the crystallization temperature of the nanocomposites. The rates of crystallization and the crystallization temperatures for the two nanocomposites are comparable as shown in FIG. 3.

Foam Cell Structure

Figure 4:
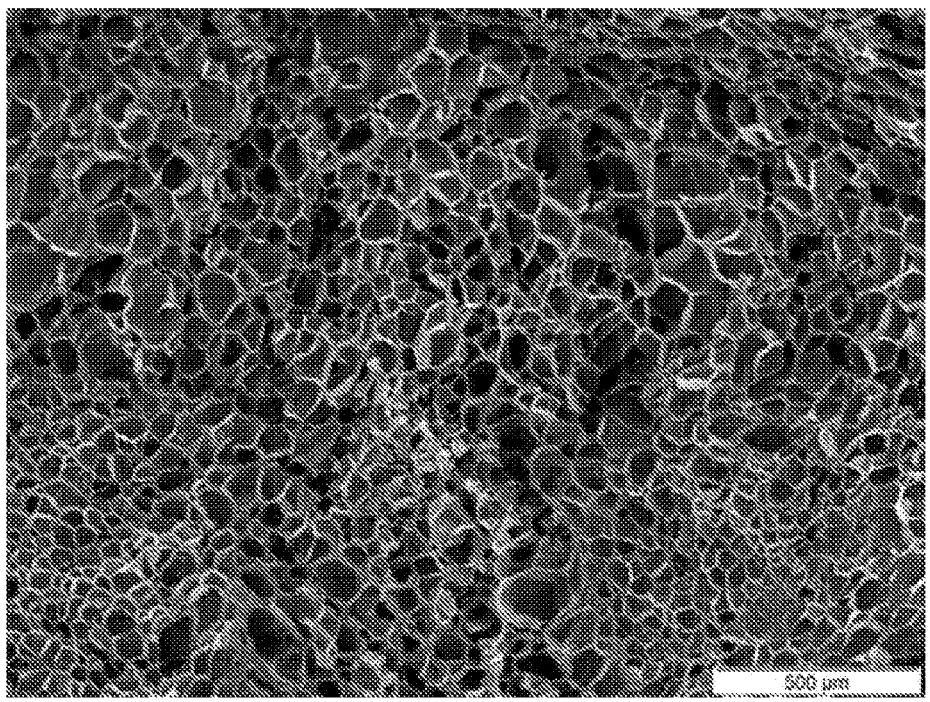
FIG. 4 shows an SEM micrograph of extruded PPNC-S4 at 60× magnification (scale bar equals 500 µm) according to an embodiment of the present invention.
Figure 5:
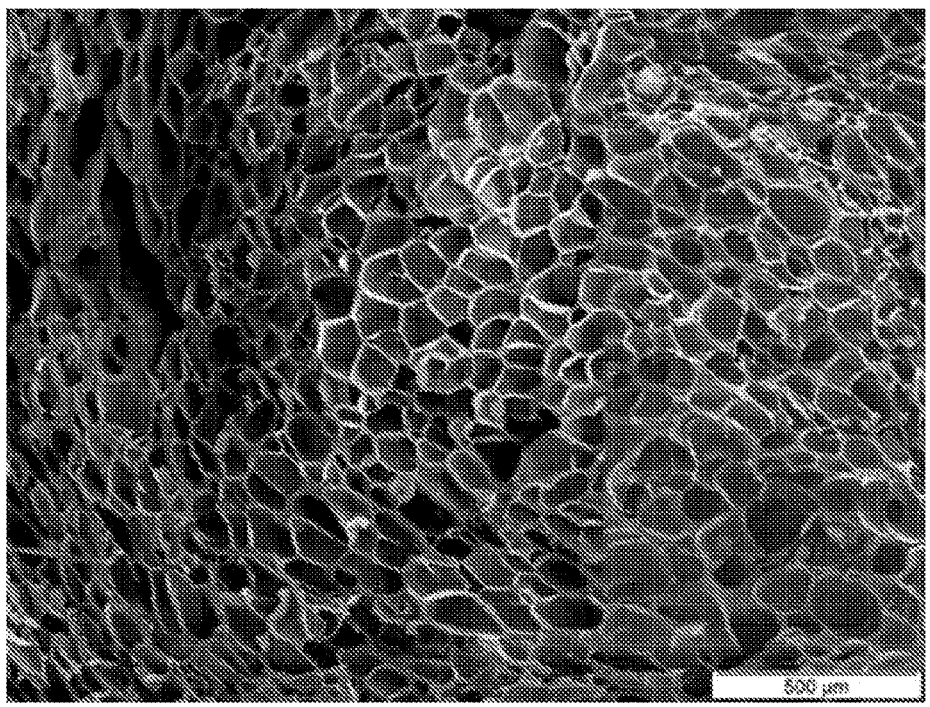
FIG. 5 shows an SEM micrograph of extruded PPNC-S7 at 60× magnification (scale bar equals 500 µm) according to an embodiment of the present invention.

SEM images for the cellular structures of the two polypropylene-clay nanocomposite closed cell foam samples are shown in FIGS. 4 and 5. The average cell size and cell density for the two foam samples are presented in Table 2 together with the density of the foam. The extent of melt strain hardening is a function of strain rate, and can be categorized as type 1 strain hardening or type 2 strain hardening, as defined herein. The stretch rate of a growing bubble or cell is inversely proportional to cell size. Hence, a polymer melt that shows significant strain hardening at the lowest strain rate but having very little strain hardening at the highest strain rates (type 2 strain hardening) results in foam with cell sizes that are larger than polymer melts displaying a similar extent of strain hardening, even at higher strain rates (type 1 strain hardening). Specifically, the cell growth is arrested at a smaller cell size in the presence of type 1 strain hardening than in the presence of type 2 strain hardening.

TABLE 2

Comparison of polymer nanocomposite foams

| Nanocomposite | Strain-hardening type of melt | Foam Density | Mean cell size | Cell number density |
|---|---|---|---|---|
| PPNC-S4 | Type 1 | 0.38 g/cc | 37.1 μm | 6.2 × 10$^6$ cells/cm$^3$ |
| PPNC-S7 | Type 2 | 0.39 g/cc | 61 μm | 2.7 × 10$^6$ cells/cm$^3$ |

Example 2

Unless otherwise stated, all equipment used for preparation of the nanocomposite and all procedures for characterization are the same as stated in Example 1.

Materials

In this study a 4 MFR linear polypropylene (PP), Profax® 6523 supplied by Lyondell-Basell was compounded with organically modified montmorillonite and polypropylene-grafted with maleic anhydride (PP-g-MA) as compatibilizer for synthesizing the nanocomposite. The chemical blowing agent used in this study was Cell-span 693K (gas volume 70 cc/g), provided by Phoenix Plastics with active ingredient being azodicarbonamide.

Preparation of Nanocomposites

Four different PP-clay nanocomposites were compounded for this study: (a) PPNC-S1 with 7.2 wt % of a treated organoclay, (b) PPNC-S2 with 3 wt % of treated organoclay, (c) PPNC-N1 with 8 wt % of treated organoclay and (d) PPNC-N2 with 8 wt % of treated organoclay. Prior to compounding both PP-g-MA and clay were dried overnight at 80° C. and 20 mm Hg vacuum in a vacuum oven. Dry nanoclay powder was pre-mixed with PP resin and PP-g-MA in a paper bag and then melt compounded in a 47 g Banbury batch mixer at 180° C. and at a rotation speed of 150 rpm for 10 minutes under nitrogen, to avoid thermal degradation. The compounded material was then granulated in a mini granulator.

A summary of the nanocomposite formulations (N1, N2, S1 and S2) is shown in Table 3 below:

TABLE 3

Summary of Nanocomposite Formulations
(N1, N2, S1 and S2) (% = wt %)

PPNC-N1 ("N1")

(68%) linear polypropylene Profax ® 6523 from Lyondell-Basell
(24%) maleated polypropylene PO1015 from ExxonMobil
(8%) I.44P Nanomer ® organoclay from Nanocor, Inc.

PPNC-N2 ("N2")

(68%) linear polypropylene Profax ® 6523 from Lyondell-Basell
(24%) maleated polypropylene AC 950 from Honeywell
(8%) I.44P Nanomer ® organoclay from Nanocor, Inc.

PPNC-S1 ("S1")

(40%) linear polypropylene Profax ® 6523 from Lyondell-Basell
(52.8%) maleated polypropylene PO1015 from ExxonMobil
(7.2%) I.44P Nanomer ® organoclay from Nanocor, Inc.

PPNC-S2 ("S2")

(76%) linear polypropylene Profax ® 6523 from Lyondell-Basell
(21%) maleated polypropylene PO1015 from ExxonMobil
(3%) I.44P Nanomer ® organoclay from Nanocor, Inc.

Extrusion of Foams

Continuous extrusion foaming was used to prepare PP nanocomposite foams. A ¾ in. single screw extruder (CW Brabender) was used for this purpose with a 2 mm diameter die having L/D=15 and a tapered transition from the extruder barrel. The extruder has four different temperature zones—three in the barrel and one in the die. (See, for example, Appendix "A" discussed in Example 4 below). The chemical blowing agent (CBA), azodicarbonamide, was used at 3 wt %. The CBA was premixed with the granulated polymer in a paper bag and was fed in the feed port of the extruder. The extruder was operated at a constant speed of 20 rpm in this study. While flowing through the single screw extruder the CBA and the PP nanocomposite fuse to form a homogeneous melt. Near the die exit, due to steep pressure drop through the die, the gas-laden polymer melt started to nucleate bubbles and the extruded polymer foam strand continued to expand until it solidified under ambient conditions.

Results and Discussion

Dispersion of Nanoclays

Figure 6:
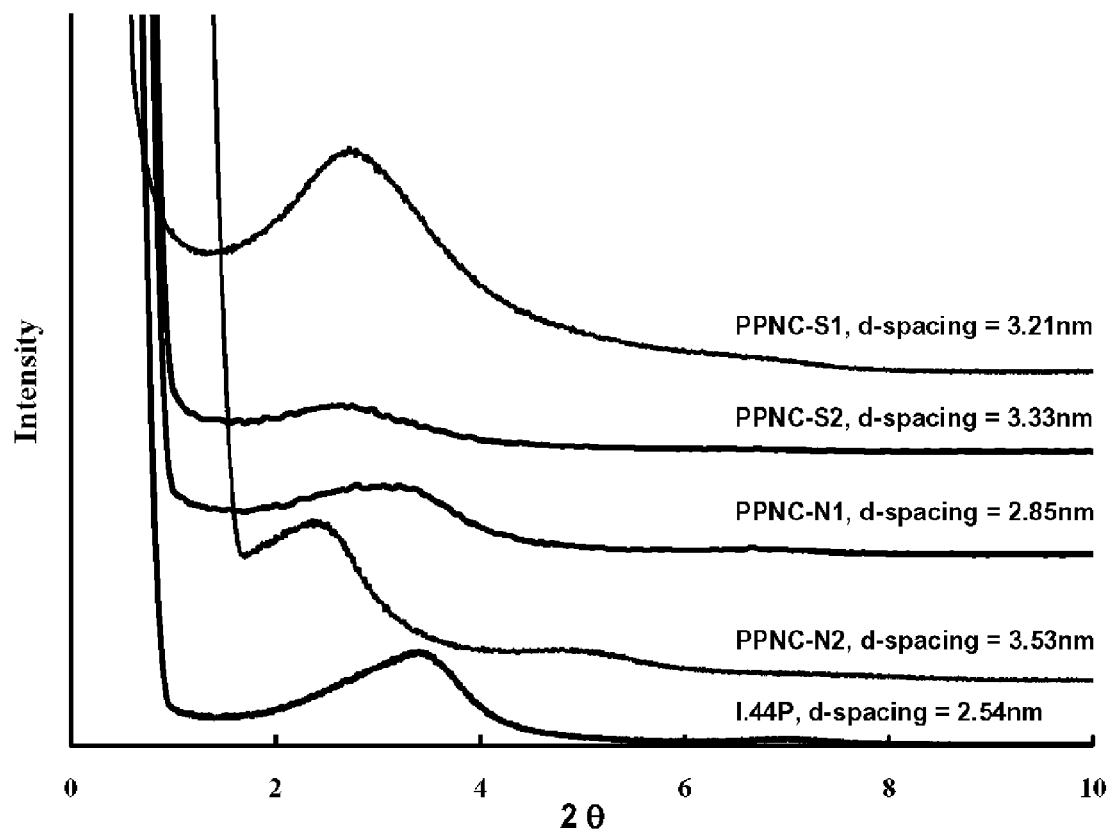
FIG. 6 shows X-Ray diffraction patterns for two different "not strain hardening" non-silane treated nanocomposites (PPNC-N1 and PPNC-N2) containing Nanomer® I.44 organoclay and two different "strain hardening" non-silane treated nanocomposites (PPNC-S1 and PPNC-S2) as compared to Nanomer® I.44 organoclay alone according to embodiments of the present invention.

X-Ray diffraction patterns for two different "not strain hardening" non-silane treated nanocomposites (N1 and N2) containing Nanomer® I.44 organoclay and two different "strain hardening" non-silane treated nanocomposites (S1 and S2) as compared with Nanomer® I.44 organoclay alone are shown in FIG. 6. The intercalation peak intensity variation among these curves indicates that S1 and N2 are more strongly intercalated than the others or the extent of exfoliation is much greater in N1 and S2. All of the nanocomposites have a higher d-spacing compared to the native organoclay.

Extensional Viscosity

Figure 7A:
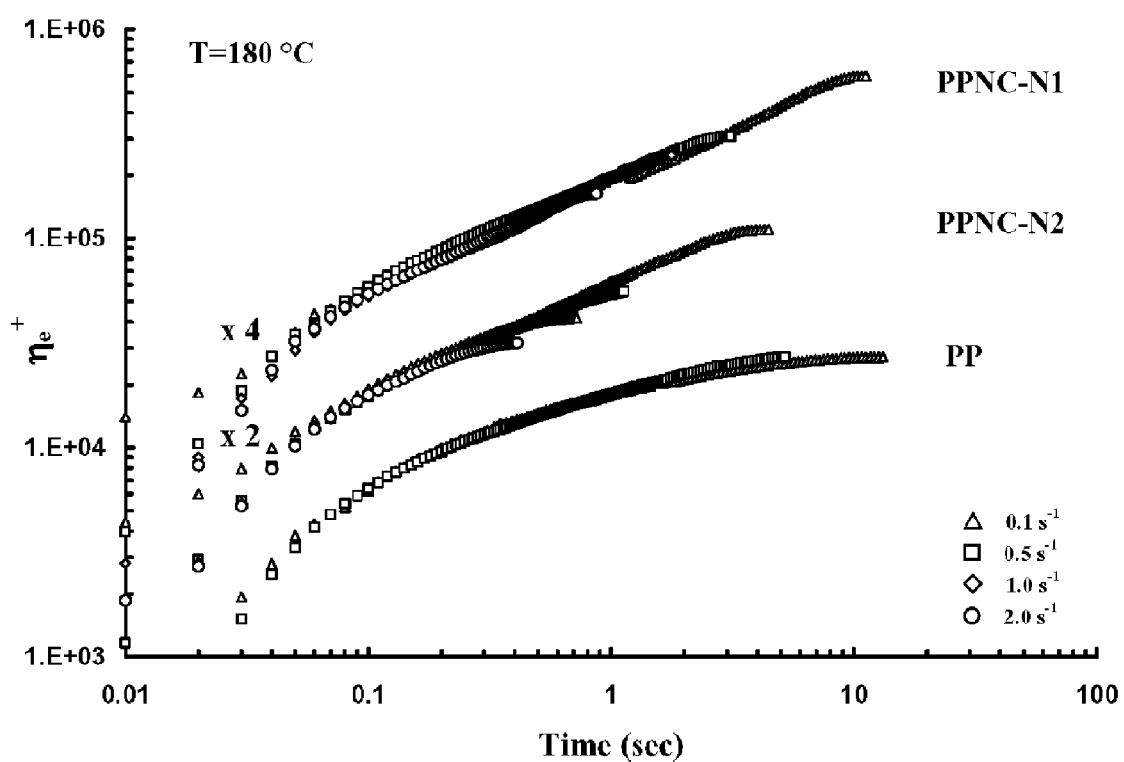
FIG. 7A shows uniaxial extensional viscosity curves at 180° C. for nanocomposites (PPNC-N1 and PPNC-N2) compared to linear PP according to embodiments of the present invention.
Figure 7B:
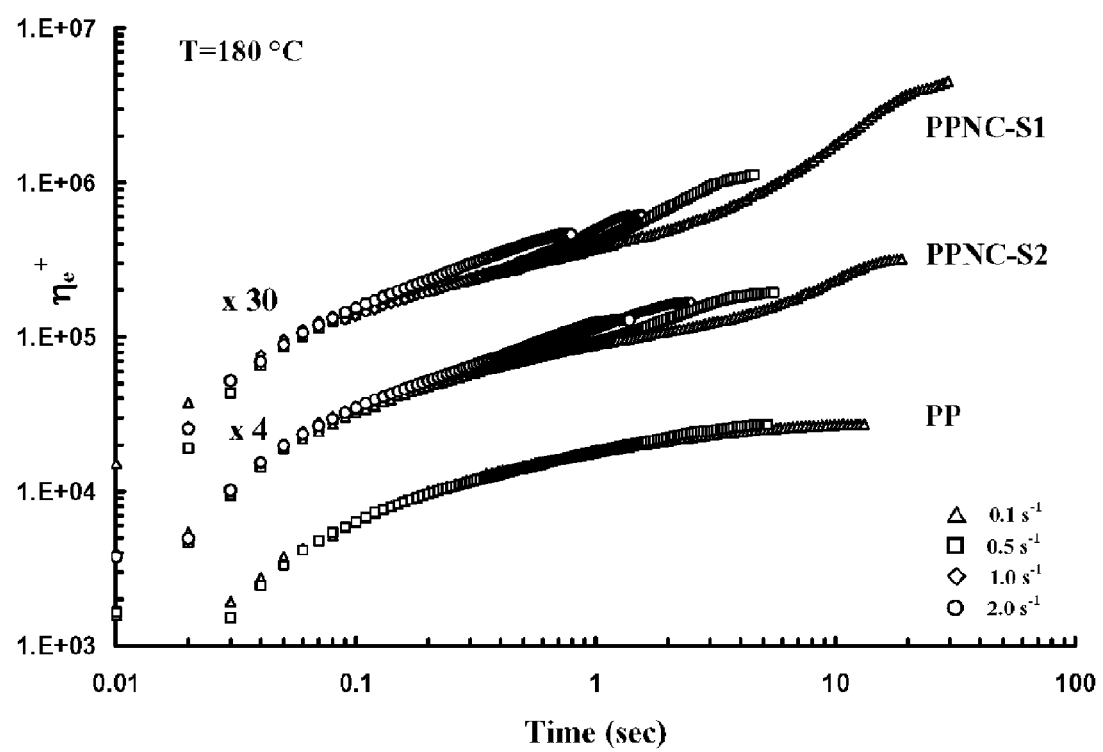
FIG. 7B shows uniaxial extensional viscosity curves at 180° C. for nanocomposites (PPNC-S1 and PPNC-S2) compared to linear PP according to embodiments of the present invention.

The uniaxial extension viscosity curves (i.e., melt extensional viscosity transients) at 180° C. for N1 and N2 as compared to linear PP are shown in FIG. 7A, while the uniaxial extension viscosity curves at 180° C. for S1 and S2 as compared to linear PP are shown in FIG. 7B. As Four different strain rates (0.1, 0.5, 1.0 and 2.0 s$^{-1}$) were used. FIGS. 7A and 7B show, N1 and N2 do not show any significant improvement in strain hardening as compared to linear PP, while S1 and S2 show distinct enhancement in strain hardening as compared to linear PP. Both S1 and S2 show type 2 strain hardening such that the strain hardening declines with increasing strain rate.

Crystallization Curves

Figure 8A:
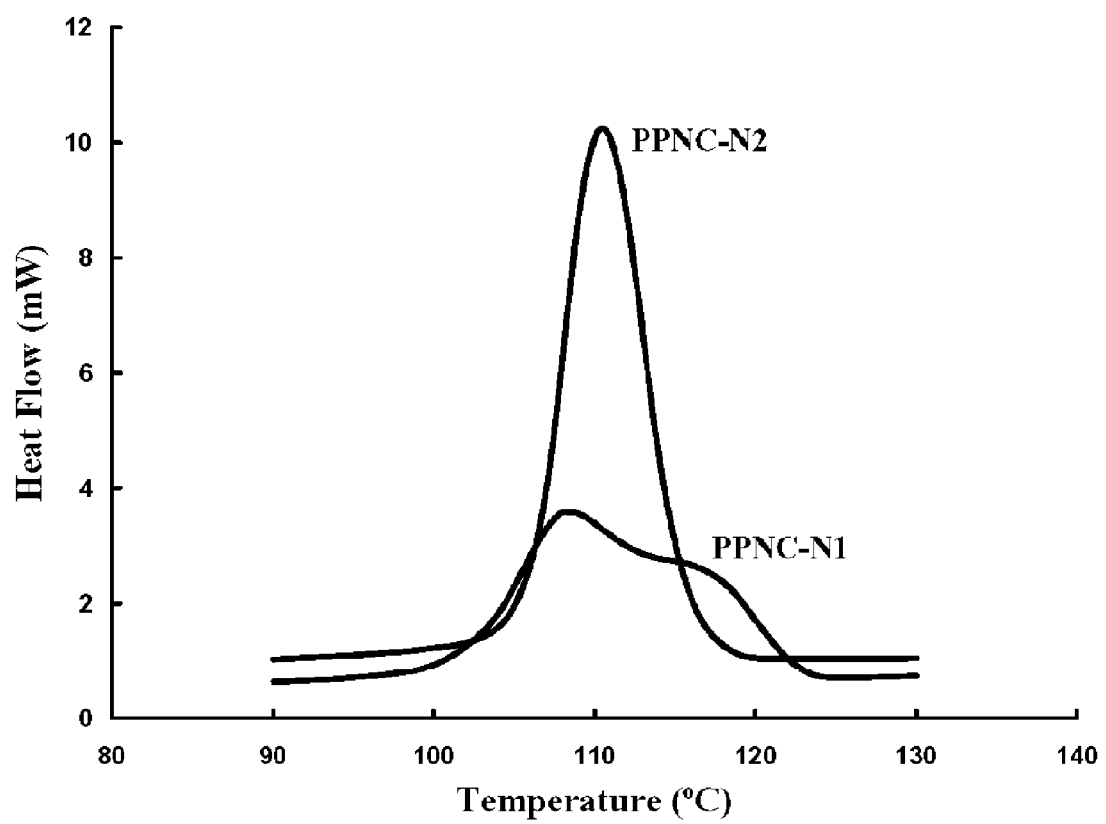
FIG. 8A shows DSC crystallization curves of PPNC-S1 and PPNC-S2 according to embodiments of the present invention.
Figure 8B:
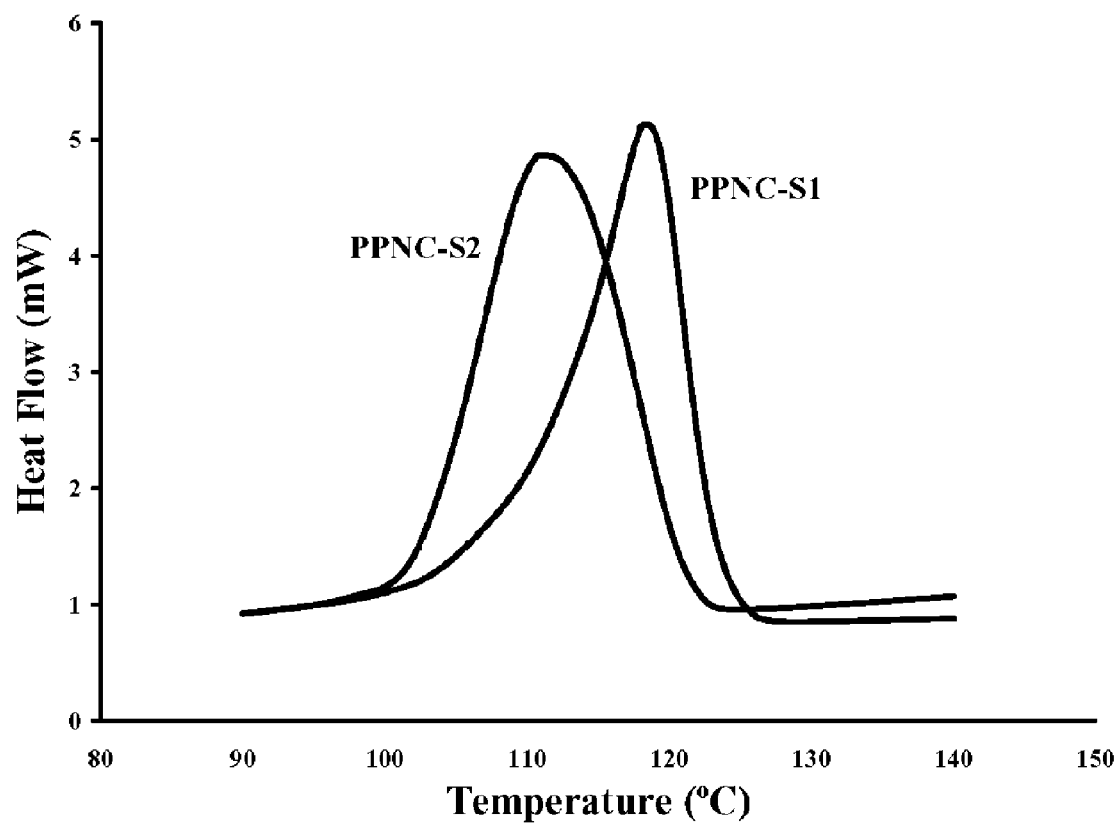
FIG. 8B shows DSC crystallization curves of PPNC-N1 and PPNC-N2 according to embodiments of the present invention

DSC tests were run on the nanocomposites to identify crystallization temperatures and rates of crystallization. As FIGS. 8A and 8B show, both N1 and N2 have almost the same crystallization temperature, although N1 has a slower rate of crystallization compared to N2. A lower crystallization rate of the polymer matrix allows the cells to expand completely before crystallization dominates. As already mentioned, neither of the two nanocomposites (N1 and N2) showed strain hardening in melt extensional flow. Therefore, any change in foam characteristics must be associated with the change in rate of crystallization.

Foam Cell Structure

The foam density values for various conditions are listed in Table 4 below. In this experiment, the nanocomposite foams produced were closed cell foams but the foam produced from linear PP was open cell foam. S1 and S2 resulted in lower density foam compared to N1 and N2.

TABLE 4

Density (g/cc) of Linear PP and PP Nanocomposite Foams

| Polymer | Foam Density |
| --- | --- |
| Linear PP | 0.4 |
| PPNC-N1 | 0.37 |
| PPNC-N2 | 0.4 |
| PPNC-S1 | 0.3 |
| PPNC-S2 | 0.3 |

The cell structures of the polymer nanocomposite foam samples are much more uniform from that of the neat polymer foam. This is evident from the SEM micrographs of the different foam samples shown in FIGS. 9-13. The average cell sizes and cell densities are tabulated in Table 5 below:

TABLE 5

Average Cell Size (Microns) and Cell Density (Cells/Cm$^3$)
Different PP Nanocomposite Foams

| | Average Cell Size | Cell Density |
| --- | --- | --- |
| PPNC-N2 | 170.9 | $0.1 \times 10^6$ |
| PPNC-N1 | 132.7 | $0.6 \times 10^6$ |
| PPNC-S1 | 86.5 | $1.3 \times 10^6$ |
| PPNC-S2 | 87.0 | $1.2 \times 10^6$ |

Figure 9:
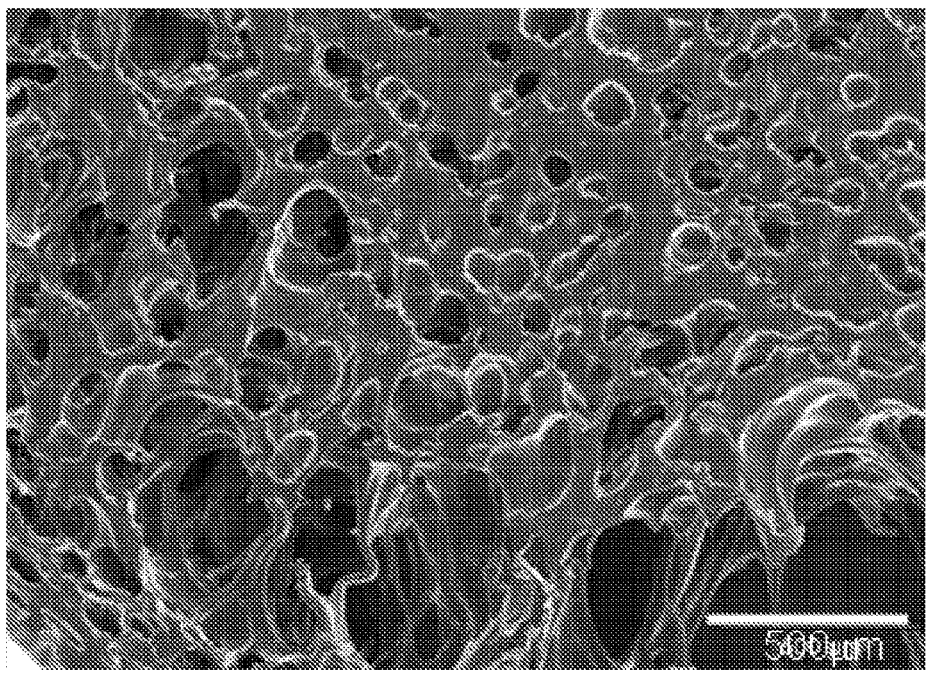
FIG. 9 shows an SEM micrograph of extruded linear PP foam (scale bar equals 500 micrometers (µm) according to an embodiment of the present invention.
Figure 10:
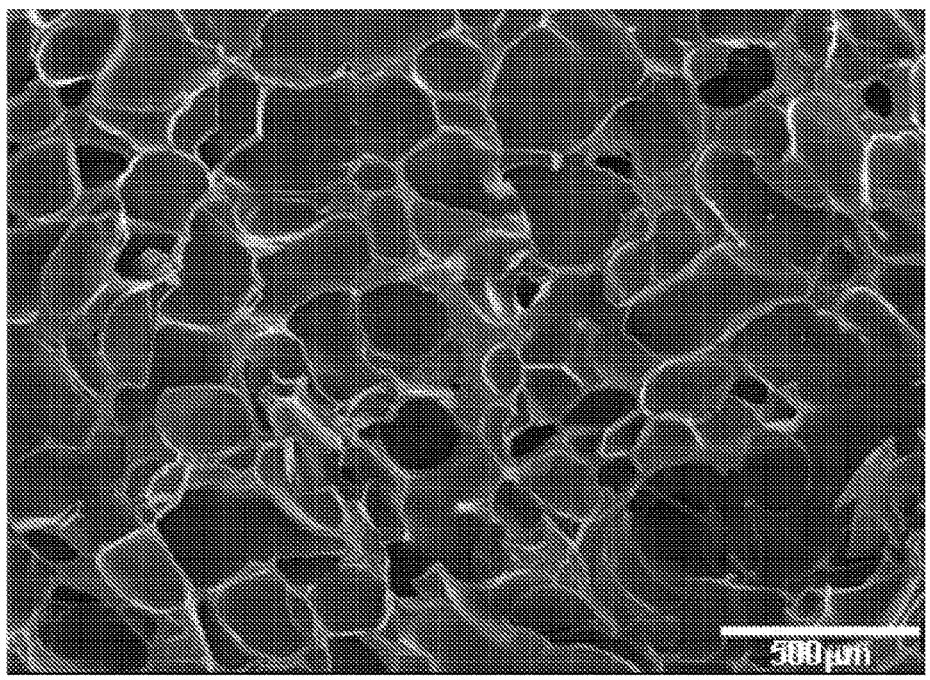
FIG. 10 shows an SEM micrograph of extruded PPNC-N2 foam at 60× magnification (scale bar equals 500 µm) according to an embodiment of the present invention.

The effect of additional nucleating sites can be seen when comparing the images in FIGS. 9 and 10. However, N2 has similar rheological and thermal characteristics as linear PP (no strain hardening and fast rate of crystallization).

Extrusion foaming of linear PP resulted in open cell foam, whereas N2 led to mostly closed cell foams. The average cell size of linear PP foam cannot be estimated because it's mostly open cell, i.e., bubbles take up large swaths of space. N2 resulted in closed cell foams with an average cell size of 170.9 micrometers ($\mu$m) and a cell density of $0.1 \times 10^6$ cells/cm$^3$.

Figure 11:
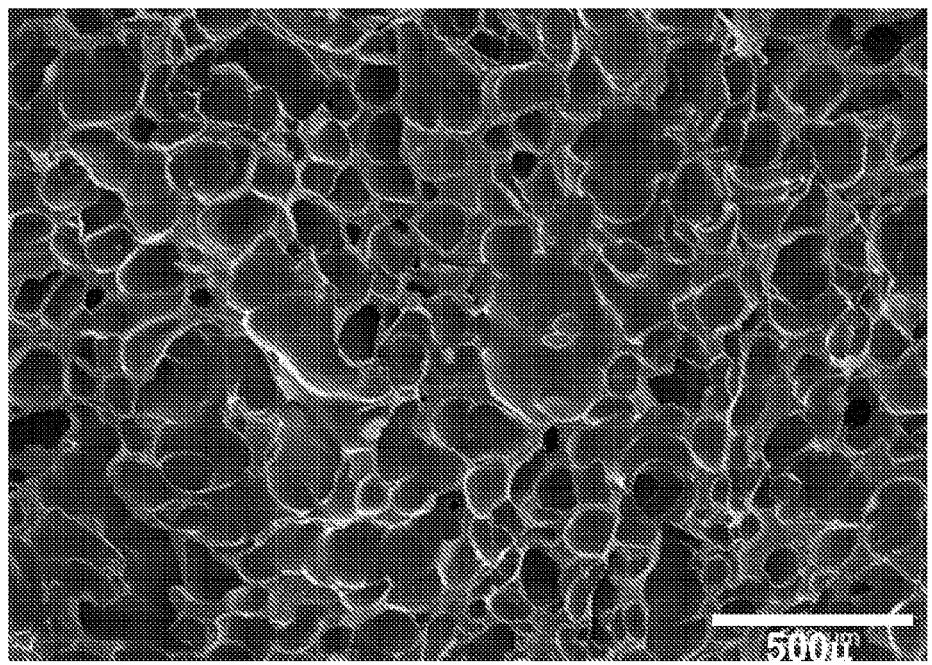
FIG. 11 shows an SEM micrograph image of extruded PPNC-N1 foam at 60× magnification (scale bar equals 500 µm) according to an embodiment of the present invention.

FIGS. 10 and 11 provide a comparison of the effect of crystallization kinetics on foam characteristics of N1 and N2. As these figures show, N1 and N2 have very similar rheological characteristics in extensional flow, but have significantly different crystallization kinetics. Even though both N1 and N2 have the same filler loading and both are intercalated in nature (reflected in the same amount of nucleating sites available of bubble nucleation), N1 resulted in foams with better foam cell morphology (lower average cell size and higher cell density) compared to N2 foam. This is likely because lower rate of crystallization of N1 helped the bubbles to expand completely before crystallization predominates, thereby resulting in foam with higher cell density ($0.6 \times 10^6$ cells/cm$^3$) and lower average cell size (132.7 $\mu$m) compared to N2.

Figure 12:
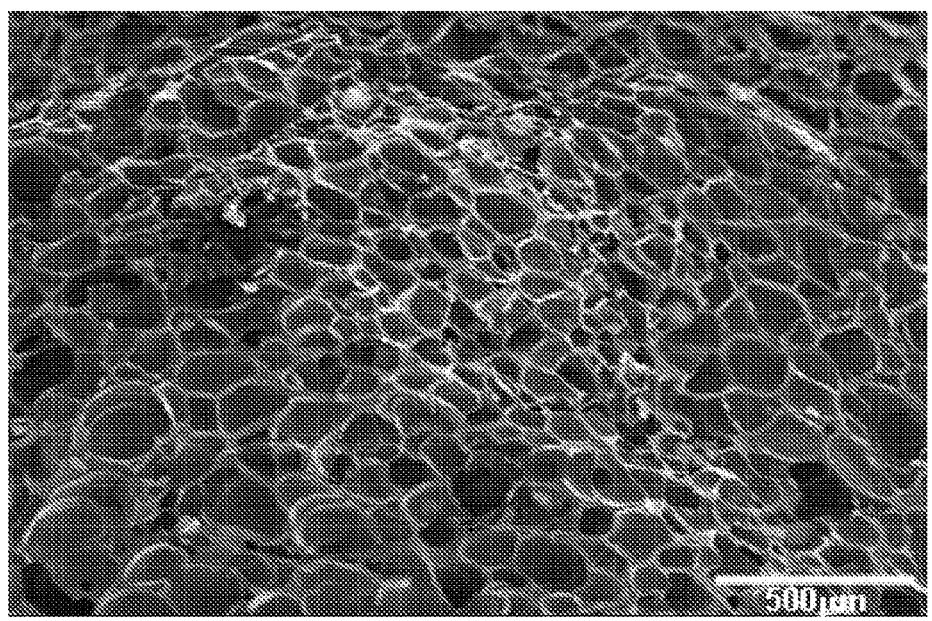
FIG. 12 shows an SEM micrograph image of extruded PPNC-S1 foam at 60× magnification (scale bar equals 500 µm) according to an embodiment of the present invention.
Figure 13:
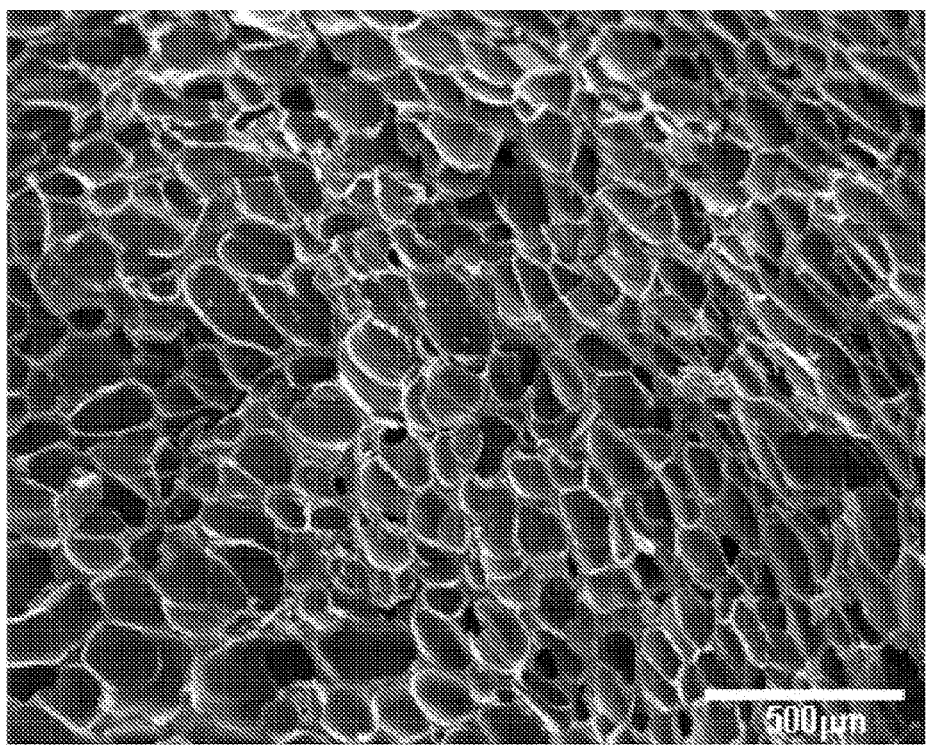
FIG. 13 shows an SEM micrograph of extruded PPNC-S2 foam at 60× magnification (scale bar equals 500 µm) according to an embodiment of the present invention.

The effect of strain hardening on foaming can be observed by comparing FIGS. 11-13. Both N1 and S1 have similar thermal characteristics and similar filler loading, although S1 shows strain hardening in uniaxial extensional flow and resulted in foams with better cell morphology. PS1 resulted in foam with the smallest average cell size (86.5 $\mu$m) and highest cell density ($1.3 \times 10^6$ cells/cm$^3$). This difference in foam quality is likely due to the presence of strain hardening. The strain hardening behavior of the S1 melt allowed the cells to expand completely into cells having a hexagonally shaped cross-section (i.e., a polyhedral), without rupturing the cell walls. The absence of strain hardening in N1 had led to cell coalescence during the later stages of cell expansion resulting in larger cells. S1 and S2, on the other hand are both strain hardening nanocomposites and results in similar foam even though S1 has higher filler loading compared to S2 reflecting that better quality foams can be produced with lower filler loadings if the polymer melt has correct rheological and thermal characteristics.

Example 3

Flexible foams based on a blend of polypropylene and an elastomer along with nanoclay and compatibilizer were prepared. The presence of the dispersed elastomer phase imparted flexibility to the foam. It was determined that elastomer particle sizes on the order of a few microns are useful in this regard.

Unless otherwise stated, all equipment used for preparation of the nanocomposite and the foam, and all procedures for characterization, are the same as stated in Example 1.

In this study a 4 MFR linear polypropylene (PP), Profax® 6523 supplied by Lyondell-Basell and a thermoplastic elastomer, Engage™ 8480 supplied by Dow Chemical Co., were compounded with organically modified montmorillonite and polypropylene-grafted with maleic anhydride (PP-g-MA) as compatibilizer for synthesizing the nanocomposite. The chemical blowing agent used in this study was Cell-span 693K (gas volume 70 cc/g), provided by Phoenix Plastics, with the active ingredient being azodicarbonamide.

A thermoplastic polyolefin (TPO)-clay nanocomposite (TPONC) was compounded for this study with 2.1 wt % of a treated organoclay. Prior to compounding, both PP-g-MA and clay were dried overnight at 80° C. and 20 mm Hg vacuum in a vacuum oven. Dry nanoclay powder was pre-mixed with PP resin, the thermoplastic elastomer and PP-g-MA in a paper bag and then melt compounded in a 47 g Banbury batch mixer at 180° C. and at a rotation speed of 150 rpm for 10 minutes under nitrogen, to avoid thermal degradation. The compounded material was then granulated in a mini granulator.

A summary of the formulations (TPONC and TPO) is shown in Table 6 below:

TABLE 6

Summary of Formulations (% = wt %)

TPONC (53.2%) linear polypropylene Profax ® 6523 from Lyondell-Basell
(30%) thermoplastic elastomer Engage ™ 8480 from Dow Chemical Co.
(14.7%) maleated polypropylene PO1015 from ExxonMobil
(2.1%) I.44P Nanomer ® organoclay from Nanomer, Inc.

TPO (70%) linear polypropylene Profax ® 6523 from Lyondell-Basell
(30%) thermoplastic elastomer Engage ™ 8480 from Dow Chemical Co.

Results and Discussion

Extensional Viscosity

Figure 14:
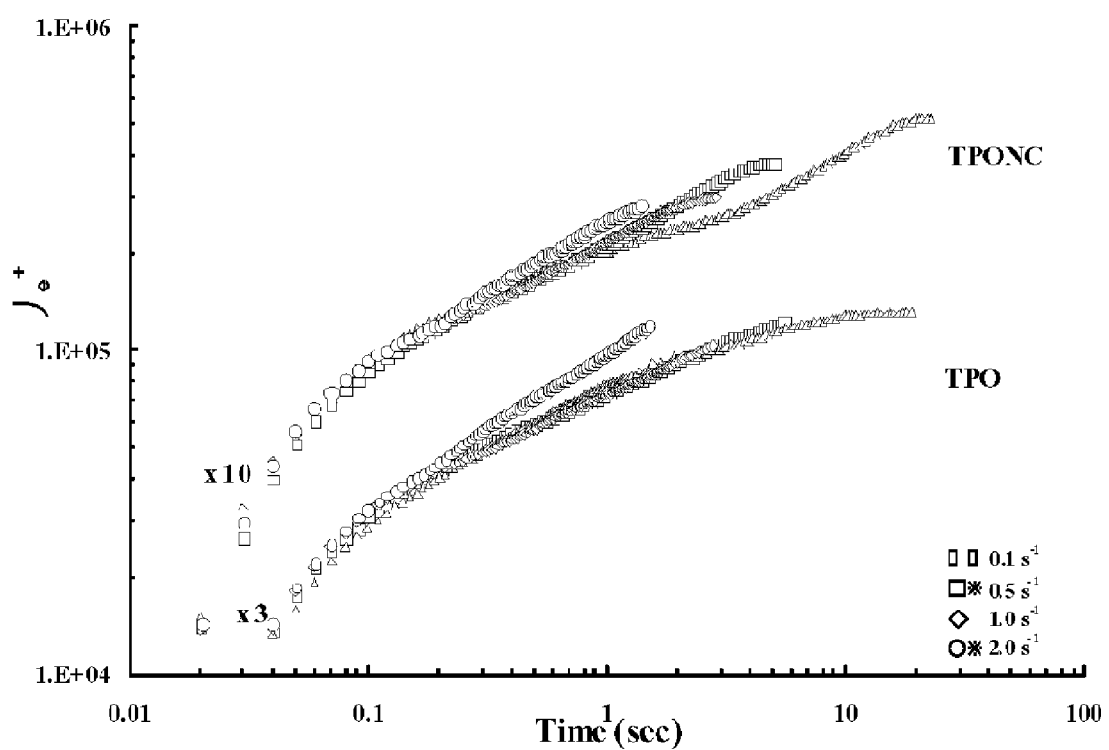
FIG. 14 shows uniaxial extensional viscosity curves at 180° C. for a TPO blend and for a TPO nanocomposite based on this blend and containing 2.1 wt % Nanomer® I.44P clay according to an embodiment of the present invention.
Figure 17:
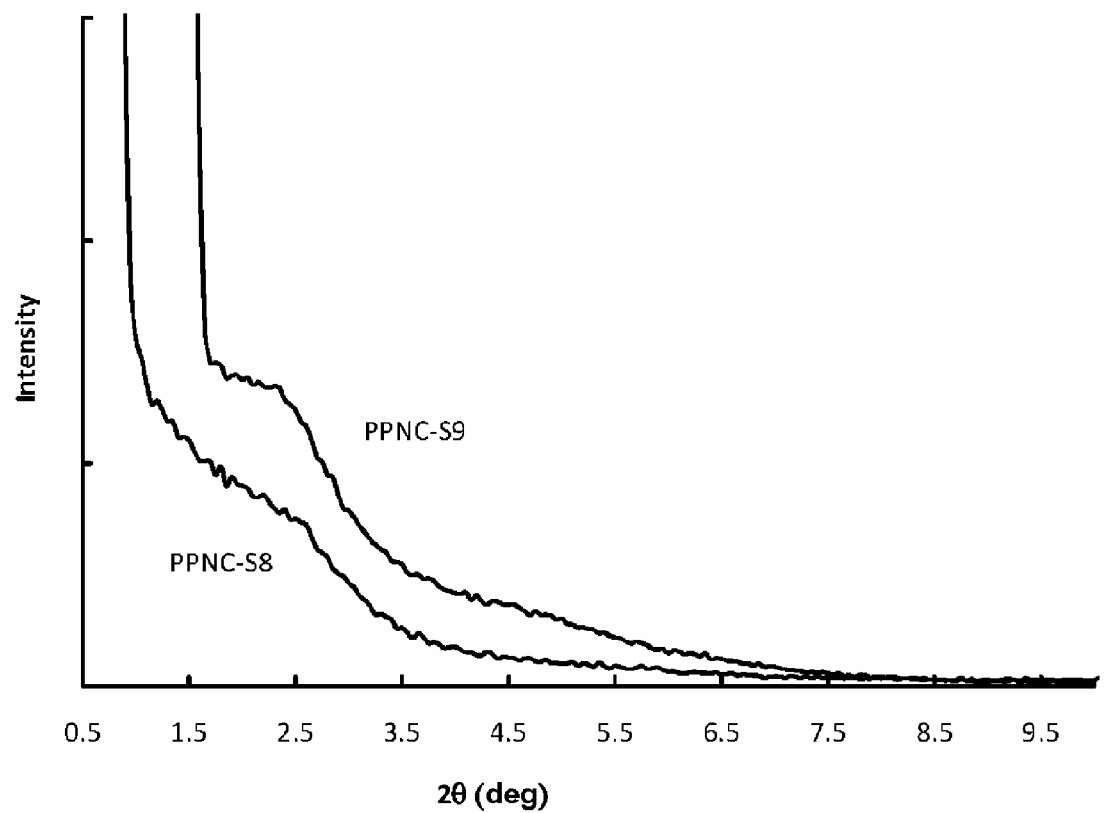
FIG. 17 shows X-Ray diffraction patterns for two different nanocomposites comprising 95 wt % PP-g-MA and 5 wt % of (a) organoclay I.44P in PPNC-S8 and (b) organoclay Cloisite 15A in PPNC-S9 according to embodiments of the invention.

The uniaxial extensional viscosity curves (i.e., melt extensional viscosity transients) at 180° C. for the thermoplastic polyolefin and its nanocomposite: TPO and TPONC are shown in FIG. 14 at four different strain rates (0.1, 0.5, 1.0 and 2.0 s$^{-1}$). FIG. 17 shows that the TPO does not show any strain hardening, while TPONC shows strain hardening distinctly.

In this experiment, the TPO nanocomposite foam produced was a closed cell foam with a density of 0.4 g/cc and the foam produced from TPO alone was open cell foam with a density of 0.43 g/cc.

Figure 15:
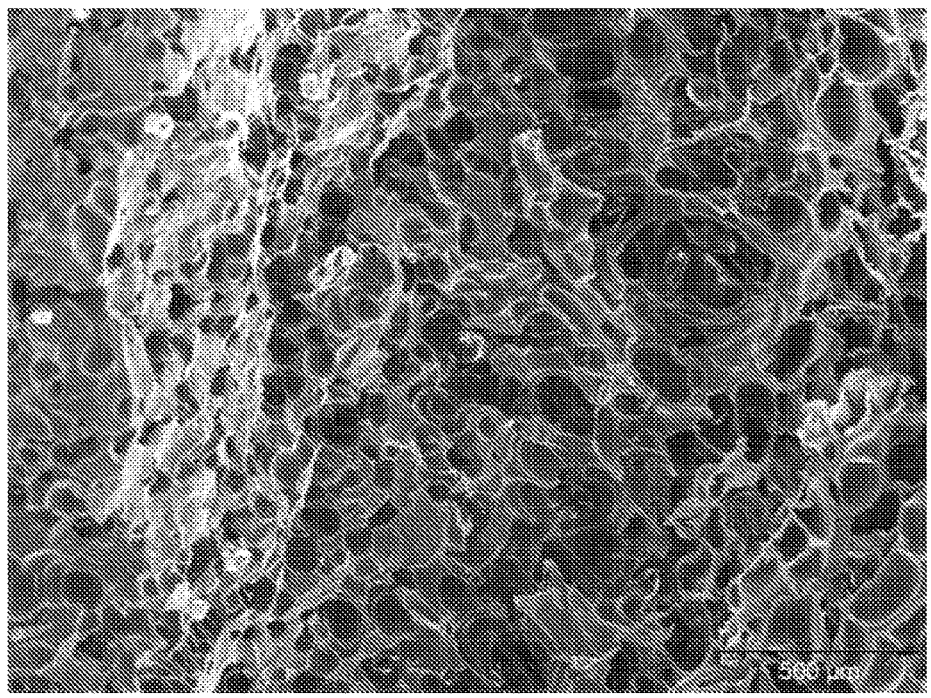
FIG. 15 shows an SEM micrograph of extruded TPO foam at 60× magnification (scale bar equals 500 µm according to an embodiment of the present invention.
Figure 16:
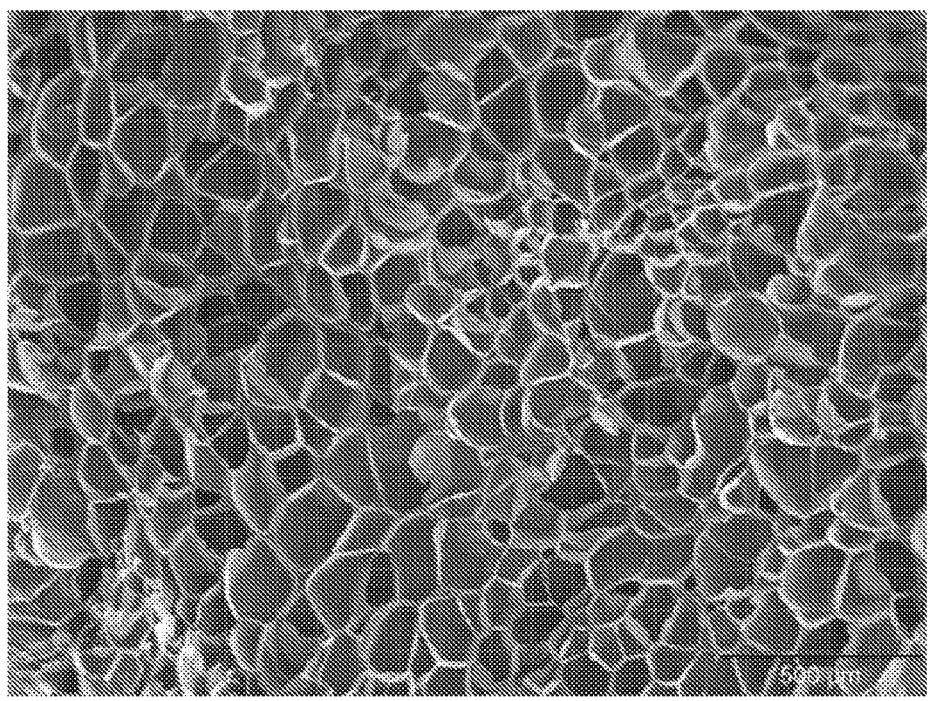
FIG. 16 shows an SEM micrograph of extruded TPO nanocomposite foam at 60× magnification (scale bar equals 500 µm according to an embodiment of the present invention.

SEM micrographs of the extruded flexible foams from TPO and TPONC are presented in FIGS. 15 and 16. The cell structure of a TPO nanocomposite foam sample (FIG. 16) is much more uniform than that of the TPO foam without nanoparticles (FIG. 15). The mean cell size in the TPO nanocomposite foam is about 80 microns.

Example 4

In this study, a linear polypropylene-grafted with maleic anhydride (PP-g-MA), PO 1015 supplied by ExxonMobil was compounded with organoclay Nanomer® I.44P from Nanocor, Inc., and organoclay Cloisite® 15A from Southern Clay Products to produce two different nanocomposites called S8 and S9. The surfactant in either organoclay is a quaternary onium ion with two alkyl tails.

Preparation of Nanocomposites

Two different nanocomposites were compounded for this study: (a) PPNC-S8 with 5 wt % of an organoclay Nanomere® I.44P, and (b) PPNC-S9 with 5 wt % of organoclay Cloisite® 15A. PP-g-MA and clay were dried overnight at 80° C. and 20 mm Hg vacuum in a vacuum oven and then compounded at 165° C. and at 150 rpm for 10 minutes in a 47 g Banbury batch mixer; this was done under a nitrogen blanket to avoid thermal degradation. The compounded material was then granulated in a mini granulator.

A summary of the nanocomposite formulations (S8 and S9) is shown in Table 7 below:

TABLE 7

| Summary of Nanocomposite Formulations (S8 and S9) (% = wt %) |
| --- |
| PPNC-S8 ("S8") |
| (95%) linear polypropylene-grafted with maleic anhydride PO1015 from ExxonMobil<br>(5%) Nanomer ® I.44P organoclay from Nanocor, Inc. |
| PPNC-S9 ("S9") |
| (95%) linear polypropylene-grafted with maleic anhydride PO1015 from ExxonMobil<br>(5%) Cloisite ® 15A organoclay from Southern Clay Products |

Characterization
X-ray Diffraction Measurement

The extent of dispersion of organoclay was characterized by X-Ray diffraction studies on a Rigaku Rotaflex Ru-200BH X-ray diffractometer. The melting temperature of the PP-g-MA alone and the corresponding nanocomposites is approximately 145° C. The nanocomposite was molded in a Wabash press at 165° C. and 10 tons (20,000 pounds) into a 1 mm thick disc that is 50 mm in diameter; a strip measuring 40 mm×20 mm×1 mm was cut out of this disc.

Extensional Viscosity Measurements

An extensional viscosity fixture (EVF) mounted on a TA Instruments ARES rheometer was used to record the transient uniaxial extensional viscosity at strain rates ranging from 0.1 $s^{-1}$ to 2 $s^{-1}$ up to a Hencky strain of 3. The melting temperature of the PP-g-MA alone and the corresponding nanocomposites is around 145° C. Therefore, the extensional viscosity tests were run at a temperature of 150° C. or above.

A 20-specimen mold was used for compression molding samples 18 mm long, 10 mm wide and 0.7 mm thick for the EVF tests. Test specimens were molded at 175° C. The mold was cooled slowly using ambient air under a pressure of 5 tons. This ensured stress free and relaxed homogenous samples with minimum dimensional variation. The molded specimens were dried overnight before performing the extensional tests. The test samples were examined after completion of the test and if any necking was noted in the stretched portion in the middle, the test was rejected.

Results and Discussion
Dispersion of Nanoclays

FIG. 17 shows X-ray diffraction patterns for the two different nanocomposites, PPNC-S8 and PPNC-S9. A more prominent shoulder is observed for PPNC-S9, indicating that Cloisite 15A is more strongly intercalated in the PPgMA matrix as compared to I.44P.

Extensional Viscosity Transients

Figure 18:
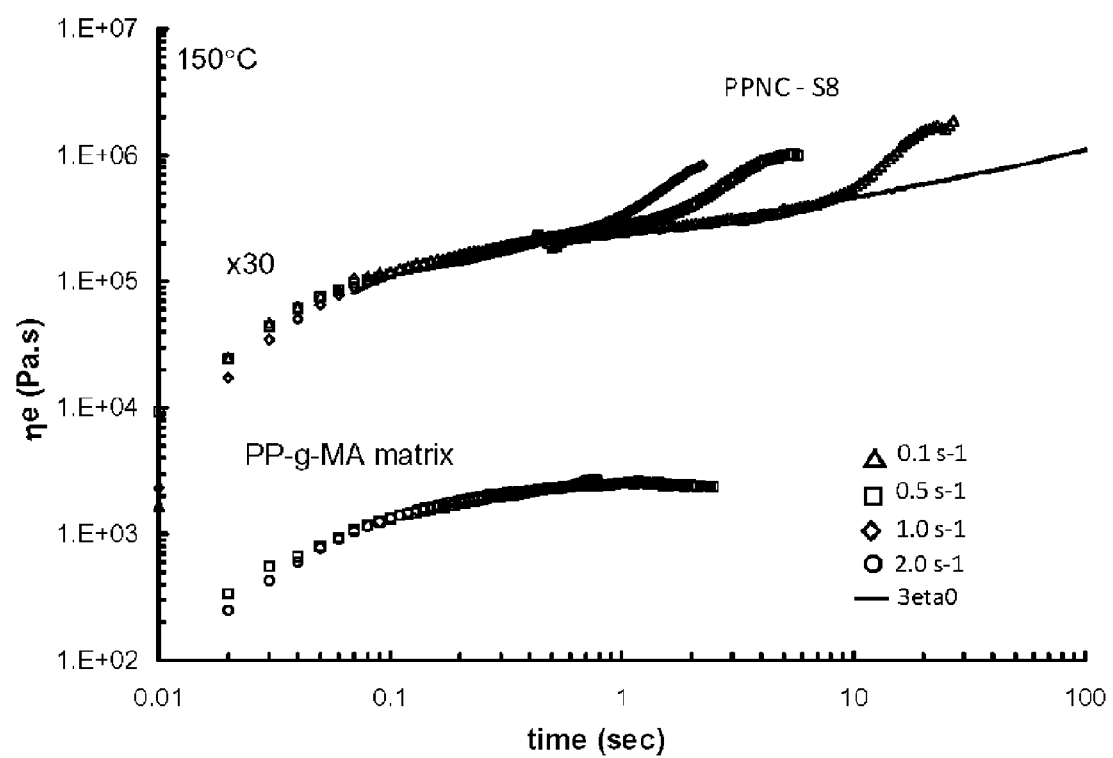
FIG. 18 shows uniaxial extensional viscosity curves at 150° C. for PPNC-S8 as compared to linear PP-g-MA according to embodiments of the invention.
Figure 19:
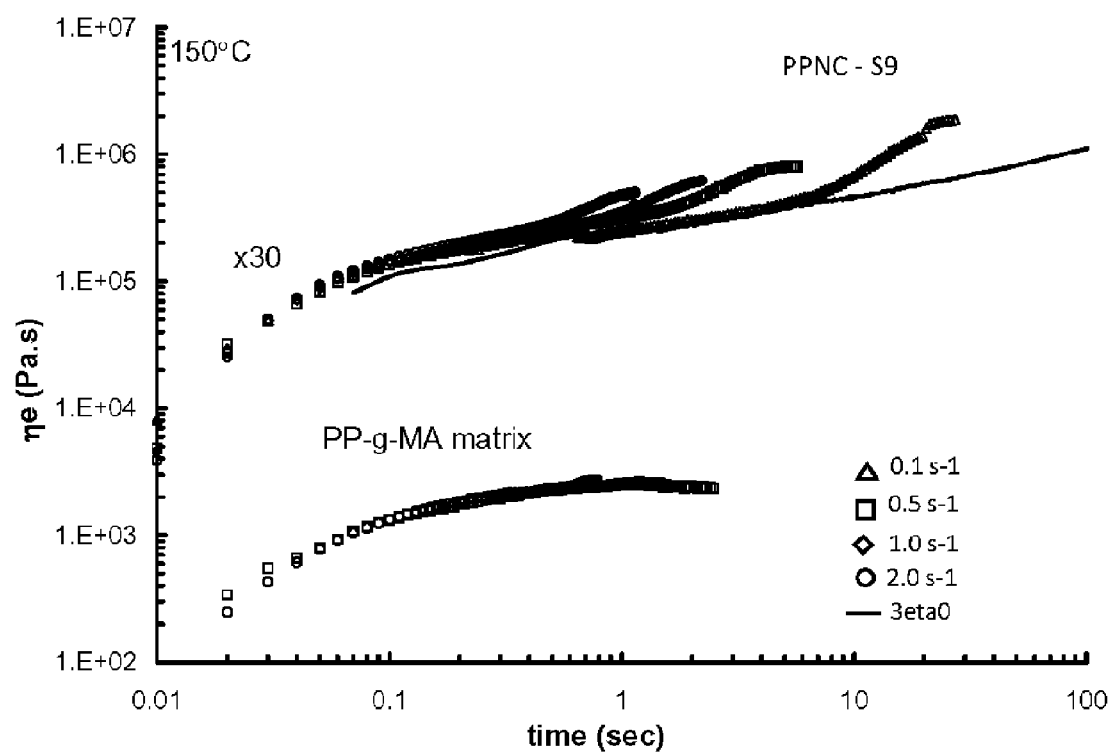
FIG. 19 shows uniaxial extensional viscosity curves at 150° C. for PPNC-S9 as compared to linear PP-g-MA according to embodiments of the invention.
Figure 20:
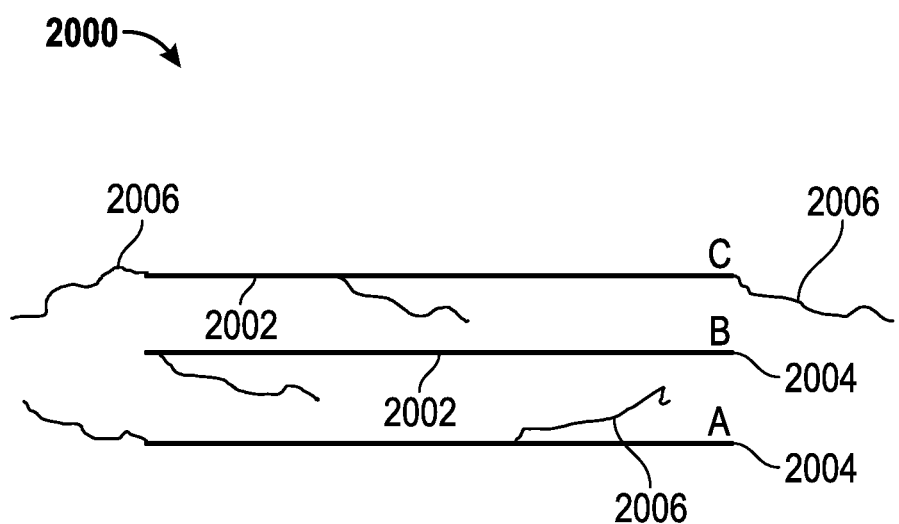
FIG. 20 is a planar schematic illustration of a stack of three aligned clay layers according to one embodiment.

The uniaxial extensional viscosity curves presented in FIG. 18 for PPNC-S8 show distinct strain hardening at various strain rates, while the curves for the linear PP-g-MA matrix show no strain hardening. The uniaxial extensional viscosity curves presented in FIG. 19 for PPNC-S9 also show distinct strain hardening at various strain rates while the curves for the linear PP-g-MA matrix show no strain hardening. These results indicate that each of the two organoclays added at 5 wt % produces strain hardening in the nanocomposite melt, while there is none in the molten matrix polymer.

Example 5

See Appendix "A" by K. Jayaraman, et al., entitled "Extensional Melt Flow of Polypropylene-Layered Silicate Nanocomposites," Jun. 19, 2008, Salerno, Italy. Appendix "A" is hereby incorporated by reference herein in its entirety, which was also incorporated by reference in U.S. Provisional Application Ser. No. 61/185,062, filed Jun. 8, 2009. Page 13 of Appendix "A" states that the "maleated polypropylene Exxelor PO 1015" used has a "maleic anhydride content—0.4 wt %", "molecular weight—70,000", and "melting point: 145° C.".

Example 6

Prophetic

It is likely other nanocomposites containing differing ratios of components and differing components will be produced and foamed as described in Examples 1-3. The other nanocomposites may, for example, include one or more elastomers and/or may omit the coupling agent. Other types of organoclays may also be tested together with bulk linear olefins other than polypropylene. Additionally, the nanocomposites discussed in Example 4 may also be foamed according to the method of Examples 1-3.

Example 7

Prophetic

All of the nanocomposites discussed herein, including in the examples, may further be blow molded into thin-walled bottles (i.e., having a thickness of less than 25 mils or 0.025 in. but at least about 10 mils or 0.01 in). For example, it is anticipated that some or all of the nanocomposites will form thin-walled bottles which are stiffer and as much as 50% less thick as compared with conventional bottles, such as bottles made from polyethylene (HDPE).

CONCLUSION

In addition to providing a greater concentration of nucleating sites for foaming the polymer matrix, addition of nanoclays with appropriate compatibilizer has the potential for improving melt strength and altering the crystallization kinetics. Extrusion foaming of different polypropylene-clay nanocomposites with a chemical blowing agent showed that the latter two effects are significant for producing closed cell foams with a more uniform cell size distribution.

The resulting foams are useful for many applications as discussed herein. Chemically blown foams are useful in the automotive industry, such as form primary and secondary seals and beltline weather seals. Use of lighter seals provides weight and cost reduction, thus improving fuel efficiency. In one embodiment, the foams contain thermoplastic elastomers, which provide sufficient elasticity for use in a wide variety of products, such as personal care goods, footwear, and sporting goods. Such materials may also be useful in vehicle exteriors (body seals) and interiors, such as door panels and instrument skins.

The resulting products are useful in a wide variety of applications. For example, the polymer foams are useful in transportation, such as for primary and secondary seals in automobiles and beltline weather seals, and the blow molded polymers are useful in packaging applications, such as for bottles.

All publications, patents and patent documents are incorporated by reference herein, each in their entirety, as though individually incorporated by reference. In the case of any inconsistencies, the present disclosure, including any definitions therein, will prevail.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present subject matter. Therefore, it is manifestly intended that embodiments of this invention be limited only by the claims and the equivalents thereof.

The invention claimed is:

1. A foam comprising:
   a foamed nanocomposite formed from a nanocomposite melt which demonstrates strain hardening in extensional flow and comprising:
      a bulk linear semi-crystalline polyolefin containing no cross-links, wherein recyclability of the foam is increased as compared to foams having cross-links;
      an organoclay containing a surfactant and having edges and faces;
      a coupling agent; and
      a polymeric compatibilizer coupled to the coupling agent via the edges and faces of the organoclay and configured to enhance physical interactions between said polyolefin and the organoclay, wherein said polyolefin combines with the organoclay to form the nanocomposite, wherein the foam is a closed cell foam containing cells having a mean cell size of about 37 microns to about 200 microns, a hexagonally-shaped cross-section, and a cell density of about $10^5$ cells/cm$^3$ to about $10^{10}$ cells/cm$^3$.

2. The foam of claim 1 wherein the coupling agent is a silane coupling agent.

3. The foam of claim 2 wherein the silane coupling agent is an aminosilane.

4. The foam of claim 3 wherein the aminosilane incorporates one to three alkoxy groups and/or halide groups.

5. The foam of claim 3 wherein the aminosilane has a primary or secondary amine group.

6. The foam of claim 1 wherein the coupling agent is a titanate.

7. The foam of claim 1 wherein the coupling agent is a phosphonate.

8. The foam of claim 1 wherein the organoclay is a smectite.

9. The foam of claim 8 wherein the smectite is montmorillonite.

10. The foam of claim 8 wherein the smectite is vermiculite or bentonite.

11. The foam of claim 1 wherein the surfactant is a primary, secondary, tertiary or quaternary onium ion.

12. The foam of claim 1 wherein the surfactant has one or more alkyl tails.

13. The foam of claim 1 wherein the bulk linear semi-crystalline polyolefin is linear polypropylene.

14. The foam of claim 1 wherein the polymeric compatibilizer is maleated polypropylene.

15. The foam of claim 1 further comprising an elastomer.

16. The foam of claim 1 wherein the foam is a flexible foam.

17. The foam of claim 16 wherein the flexible foam is a self-skinning flexible foam.

18. The foam of claim 1 capable of being formed into a foam product with a chemical blowing agent.

19. The foam of claim 18 wherein the foam product comprises automotive trim, instrument panel, seals, insulation materials, furniture, sports products or packaging.

20. The foam of claim 1 wherein the nanocomposite comprises one or more stacks of aligned clay layers.

21. The foam of claim 1 wherein cells in the foam have a mean cell size of about 37 microns to about 150 microns.

22. The foam of claim 1 wherein cells in the foam have a mean cell size of about 61 microns to about 200 microns.

23. The foam of claim 1 wherein cells in the foam have a mean cell size of about 61 microns to about 150 microns.

24. A method of making a foam comprising:
   producing a nanocomposite melt which demonstrates strain hardening in extensional flow, the method comprising:
      providing a bulk linear semi-crystalline polyolefin containing no cross-links, wherein recyclability of the foam is increased as compared to foams having cross-links;
      providing an organoclay having a surfactant and having edges and faces;
      providing a coupling agent; and
      allowing a polymeric compatibilizer to couple to the coupling agent via the edges and faces of the organoclay, wherein the polymeric compatibilizer is configured to enhance physical interactions between said polyolefin and the organoclay, wherein said polyolefin combines with the organoclay to form the nanocomposite; and
   foaming the nanocomposite to produce the foam, wherein the foam is a closed cell foam containing cells having a mean cell size of about 37 microns to about 200 microns, a hexagonally-shaped cross-section, and a cell density of about $10^5$ cells/cm$^3$ to about $10^{10}$ cells/cm$^3$.

25. The method of claim 24 wherein the foaming is selected from chemical blowing, supercritical foaming, physical blowing, and combinations thereof.

26. A thermoplastic seal comprising:
   a foamed nanocomposite formed from a nanocomposite melt which demonstrates strain hardening in extensional flow, the foamed nanocomposite comprising:
      a bulk linear semi-crystalline polyolefin containing no cross-links, wherein recyclability of the foamed nanocomposite is increased as compared to foam nanocomposites having cross-links;
      an organoclay having a surfactant and having edges and faces;
      a coupling agent; and
      a polymeric compatibilizer coupled to the coupling agent via the edges and faces of the organoclay and configured to enhance physical interactions between said polyolefin and the organoclay, wherein said polyolefin combines with the organoclay to form the nanocomposite, wherein the foam is a closed cell foam containing cells having a mean cell size of about 37 microns to about 200 microns, a hexagonally-shaped cross-section, and a cell density of about $10^5$ cells/cm$^3$ to about $10^{10}$ cells/cm$^3$.

27. The thermoplastic seal of claim 26 further comprising an elastomer.

* * * * *